(12) United States Patent  (10) Patent No.: US 12,493,207 B2
Gao et al.  (45) Date of Patent: Dec. 9, 2025

(54) DISPLAY SYSTEM WITH SEGMENTED SUPER RESOLUTION

(71) Applicant: Goertek Electronics Inc., Santa Clara, CA (US)

(72) Inventors: Kun Gao, Dublin, CA (US); Takeo Matsukawa, San Jose, CA (US)

(73) Assignee: Goertek Electronics Inc., Santa Clara, CA (US)

( * ) Notice: Subject to any disclaimer, the term of this patent is extended or adjusted under 35 U.S.C. 154(b) by 132 days.

(21) Appl. No.: 18/612,979

(22) Filed: Mar. 21, 2024

(65) Prior Publication Data

US 2025/0298270 A1  Sep. 25, 2025

(51) Int. Cl.
*G02F 1/1335* (2006.01)
*G02B 27/01* (2006.01)
*H04N 9/31* (2006.01)

(52) U.S. Cl.
CPC ... *G02F 1/133504* (2013.01); *G02B 27/0172* (2013.01); *H04N 9/3155* (2013.01)

(58) Field of Classification Search
None
See application file for complete search history.

(56) References Cited

U.S. PATENT DOCUMENTS

| | | | | |
|---|---|---|---|---|
| 8,502,128 B1 * | 8/2013 | Streuber | ............... | F41G 7/2253 244/3.17 |
| 10,852,817 B1 * | 12/2020 | Ouderkirk | .............. | G06V 40/18 |
| 11,828,946 B2 * | 11/2023 | Meitav | ............... | G02B 27/0093 |
| 12,204,096 B2 * | 1/2025 | Kelly | .................... | G02B 26/105 |
| 2013/0308084 A1 * | 11/2013 | Niwano | ................ | G02F 1/1339 349/155 |
| 2016/0223819 A1 * | 8/2016 | Liu | ........................ | G02B 5/3083 |
| 2018/0003962 A1 * | 1/2018 | Urey | .................. | G02B 27/0093 |
| 2018/0275410 A1 | 9/2018 | Yeoh et al. | | |
| 2020/0096796 A1 | 3/2020 | Acreman et al. | | |
| 2021/0173291 A1 * | 6/2021 | Wu | ....................... | G03B 21/005 |
| 2021/0247613 A1 * | 8/2021 | Hudman | ................ | G06V 40/18 |
| 2022/0107500 A1 | 4/2022 | Khorasaninejad et al. | | |

(Continued)

OTHER PUBLICATIONS

International Search Report and Written Opinion received for PCT Patent Application No. PCT/US2024/061760, mailed on Feb. 21, 2025, 10 pages.

(Continued)

*Primary Examiner* — Mushfikh I Alam
(74) *Attorney, Agent, or Firm* — ARENTFOX SCHIFF LLP

(57) ABSTRACT

A display system includes a projector configured to project light beams on a first region of a dual state liquid crystal (LC) panel to form a first image on the first region. The display system includes the dual state LC panel configured to operate in a dual state where the first region reflects the light beams projected by the projector and a second region of the dual state LC panel transmits light beams of a second image. The display system directs light beams of the first image and the second image onto different areas of a retina of an eye of a user of the display system. The display system includes processing circuitry configured to: determine a location of the first region on the dual state LC panel and control the dual state LC panel and the projector based on the gaze direction.

18 Claims, 10 Drawing Sheets

(56) References Cited

U.S. PATENT DOCUMENTS

2022/0350153 A1    11/2022  Takashima
2024/0232617 A1*    7/2024  Lin ..................... G06N 3/0675
2024/0369832 A1*   11/2024  Xiao ................ G02F 1/133605

OTHER PUBLICATIONS

Kuan-Wu Lin et al., "Polarization-Selective Ultra-Broadband Reflective Diffuser as a Smart Projection Screen". Adv. Photonics Res., 3: 2200016., 2022.
"What to Look for in a DLP Projector", ViewSonic Corporation, Jul. 28, 2019.
Wikipedia contributors., "Twisted nematic field effect". Wikipedia, The Free Encyclopedia. Feb. 10, 2024.
Wikipedia contributors., "See-through display". Wikipedia, The Free Encyclopedia. Feb. 28, 2024.
Wikipedia contributors., "Active-matrix liquid-crystal display". Wikipedia, The Free Encyclopedia. Dec. 27, 2023.

* cited by examiner

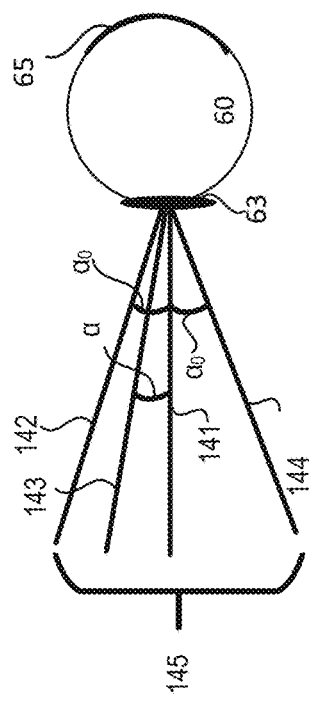
FIG. 1A
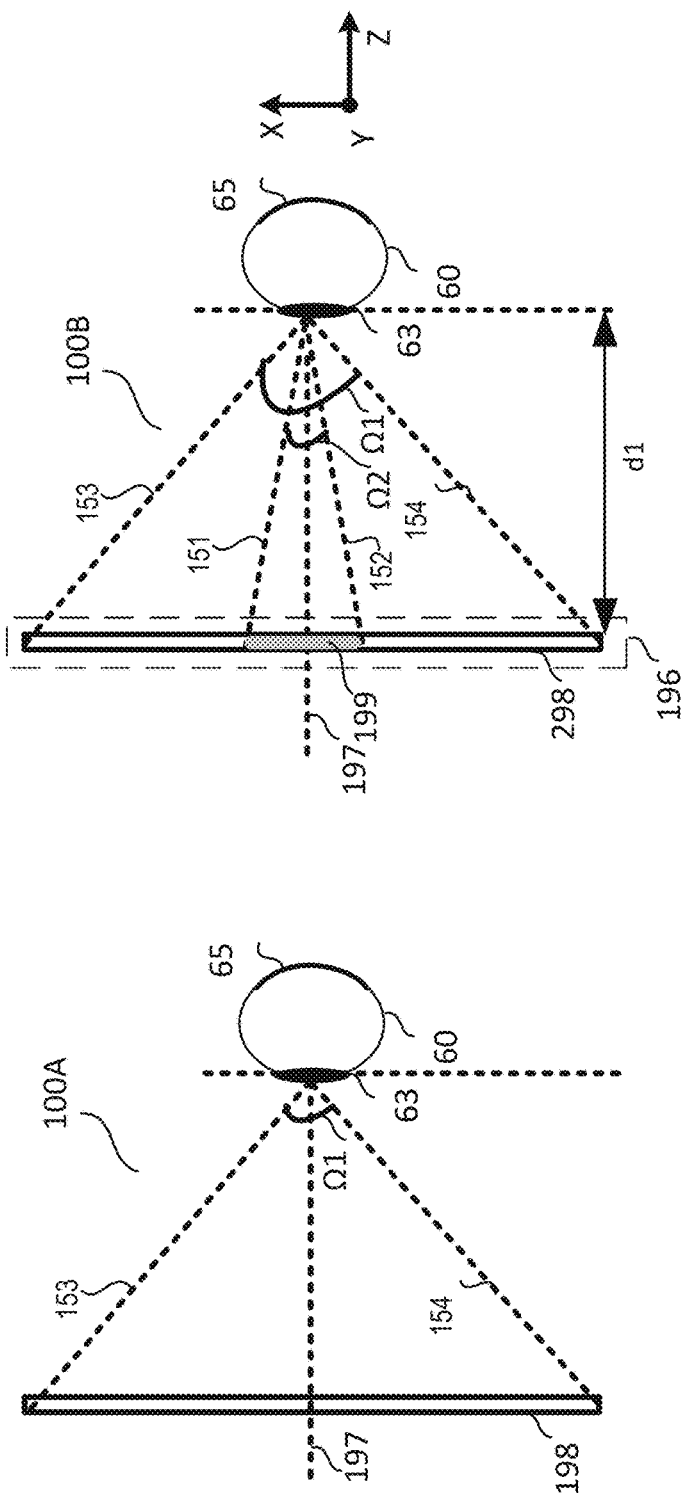
FIG. 1C
FIG. 1B

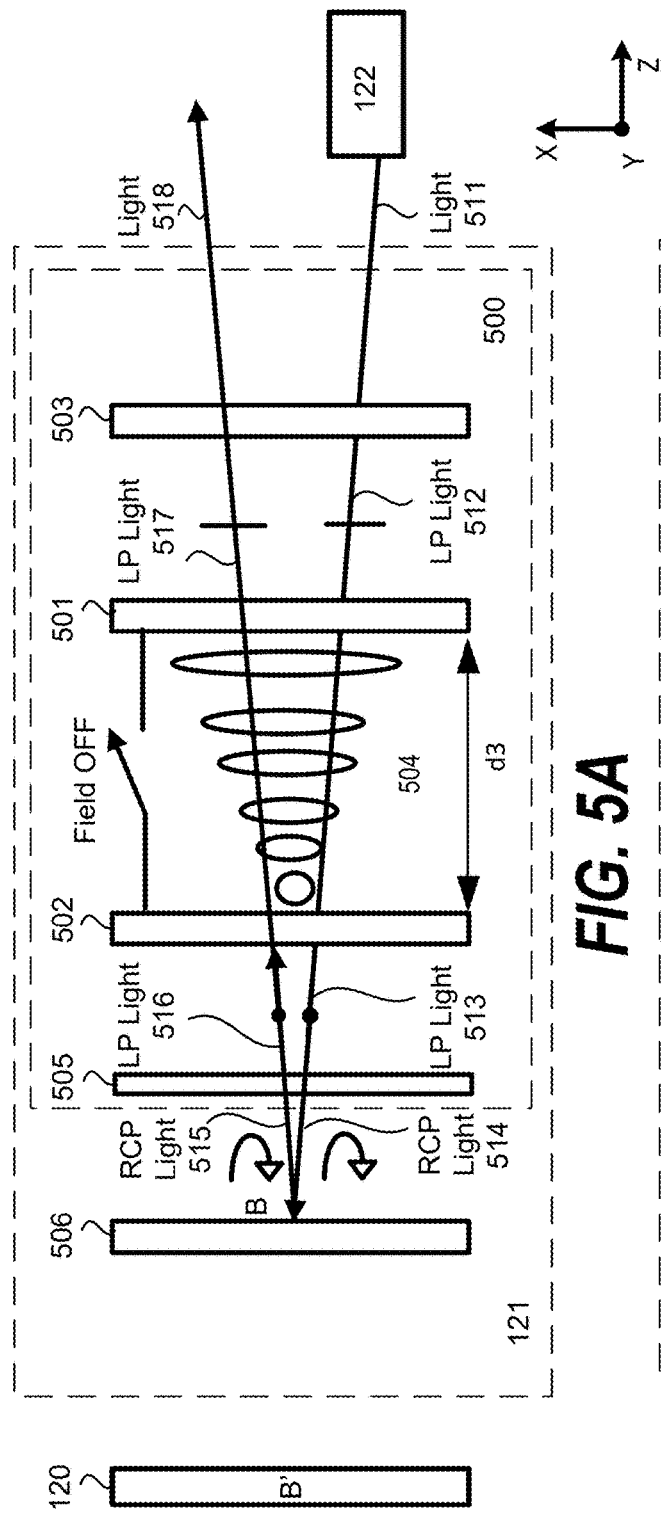
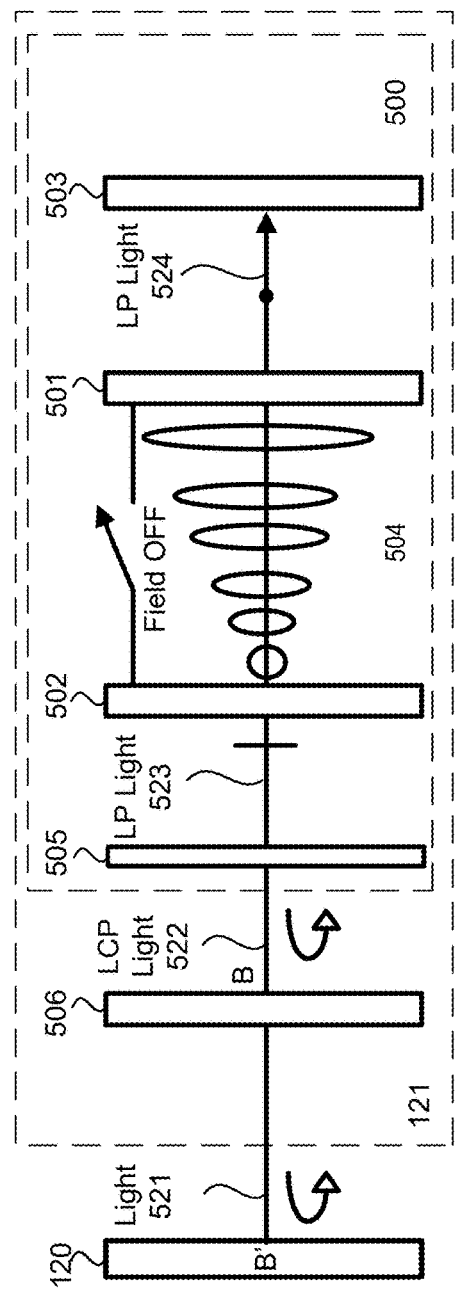
FIG. 5A
FIG. 5B

DISPLAY SYSTEM WITH SEGMENTED SUPER RESOLUTION

TECHNICAL FIELD

The present disclosure includes aspects related to display technology, such as near eye display technology.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Near eye display (NED) devices or systems are being developed to provide an improved user experience in fields such as virtual reality (VR). The NED devices can include various wearable devices, such as a head mounted display (HMD) device or system, smart glasses, and the like. In an example, an HMD device includes a relatively small display device and optics that can create a virtual image in the field of view of one or both eyes. To the eye, the virtual image appears at a distance and appears much larger than the relatively small display device.

SUMMARY

Aspects of the disclosure provide a display system including: a projector configured to project light beams on a first region of a dual state liquid crystal (LC) panel to form a first image on the first region of the dual state LC panel; a display panel configured to display a second image; the dual state LC panel disposed between the projector and the display panel and configured to operate in a dual state in which the first region of the dual state LC panel is configured to reflect the light beams projected by the projector and a second region of the dual state LC panel is configured to transmit light beams of the second image from the display panel; a viewing optical system configured to direct the reflected light beams of the first image and the transmitted light beams of the second image onto different areas of a retina of an eye of a user of the display system; a sensor configured to generate gaze direction information indicating a gaze direction of the eye; and processing circuitry configured to: determine the gaze direction based on the gaze direction information; determine a location of the first region on the dual state LC panel based on the gaze direction; and control the dual state LC panel to operate in the dual state and the projector to project the light beams on the first region on the dual state LC panel.

In some aspects, the first image formed by the projector has a resolution that is higher than a resolution of the second image formed by the display panel.

In some aspects, the first region of the dual state LC panel is configured to block a portion of the second image; and the first image and the portion of the second image include a same image having different resolutions.

In some aspects, the processing circuitry is further configured to control directions of the projected light beams that are incident onto the first region on the dual state LC panel such that angles between directions of the reflected light beams of the first image and the gaze direction are less than a threshold angle and the first image is positioned within a central vision of the eye of the user of the display system.

In some aspects, an average angle of angles between directions of the transmitted light beams of the second image and the gaze direction is larger than the threshold angle and the transmitted light beams of the second image are positioned within a peripheral vision of the eye, and the peripheral vision is outside the central vision of the eye.

In some aspects, the dual state LC panel includes an LC spatial light modulator (SLM) and an LC layer attached to the LC SLM; the LC layer is configured to reflect light beams having a first circular polarization and to transmit light beams having a second circular polarization where handedness of the first circular polarization is opposite to handedness of the second circular polarization; the LC SLM is disposed between the LC layer and the projector; the LC SLM includes multiple LC cells that are individually controlled; and the processing circuitry is configured to: apply a first electrical signal to a first subset of the multiple LC cells where the first subset of the multiple LC cells and a first portion of the LC layer correspond to the first region of the dual state LC panel; and apply a second electrical signal to a second subset of the multiple LC cells where the second subset of the multiple LC cells and a second portion of the LC layer correspond to the second region of the dual state LC panel.

In some aspects, the LC layer includes a polymer-stabilized cholesteric LC (PSCLC) diffuser.

In some aspects, the projector is a digital light processing (DLP) projector.

In some aspects, the processing circuitry is configured to control the dual state LC panel and the projector based on the gaze direction.

In some aspects, the display system is a head mounted display (HMD) system.

In some aspects, the techniques described herein relate to a method of forming a multi-resolution image. The method includes: determining a gaze direction of an eye of a user of a display system that includes a projector, a display panel, and a dual state LC panel; determining a location of a first region of the dual state LC panel based on the gaze direction; controlling the projector to project light beams on the first region to form a first image on the first region of the dual state LC panel; displaying a second image by the display panel; controlling the first region of the dual state LC panel to reflect the first image formed by the projector; and controlling a second region of the dual state LC panel to transmit the second image. The multi-resolution image including the reflected first image and the transmitted second image is formed on the dual state LC panel.

In some aspects, the controlling the first region includes controlling the first region to block a portion of the second image; and the first image and the portion of the second image include a same image having different resolutions.

In some aspects, the controlling the projector includes: controlling directions of the projected light beams that are incident onto the first region on the dual state LC panel such that angles between directions of the reflected light beams of the first image and the gaze direction are less than a threshold angle and the first image is positioned within a central vision of the eye of the user of the display system.

In some aspects, the dual state LC panel includes an LC spatial light modulator (SLM) and an LC layer attached to the LC SLM; the LC layer is configured to reflect light beams having a first circular polarization and to transmit light beams having a second circular polarization where handedness of the first circular polarization is opposite to handedness of the second circular polarization; the LC SLM includes multiple LC cells that are individually controlled; the controlling the first region includes applying a first electrical signal to a first subset of the multiple LC cells where the first subset of the multiple LC cells and a first portion of the LC layer correspond to the first region of the dual state LC panel; and the controlling the second region includes applying a second electrical signal to a second subset of the multiple LC cells where the second subset of the multiple LC cells and a second portion of the LC layer correspond to the second region of the dual state LC panel.

In some aspects, the method further includes controlling the dual state LC panel and the projector based on the gaze direction.

BRIEF DESCRIPTION OF THE DRAWINGS

Further features, the nature, and various advantages of the disclosed subject matter will be more apparent from the following detailed description and the accompanying drawings in which:

FIG. 1A shows examples of different visions according to an aspect of the disclosure;

FIG. 1B shows an example of a display system having a single pixel density according to an aspect of the disclosure;

FIG. 1C shows an example of a display system having multiple pixel densities according to aspects of the disclosure;

FIGS. 5A-5D show examples of light beam propagations in a dual state LC cell in a first state or a second state according to some aspects of the disclosure;

DETAILED DESCRIPTION OF EMBODIMENTS

Figure 2A:
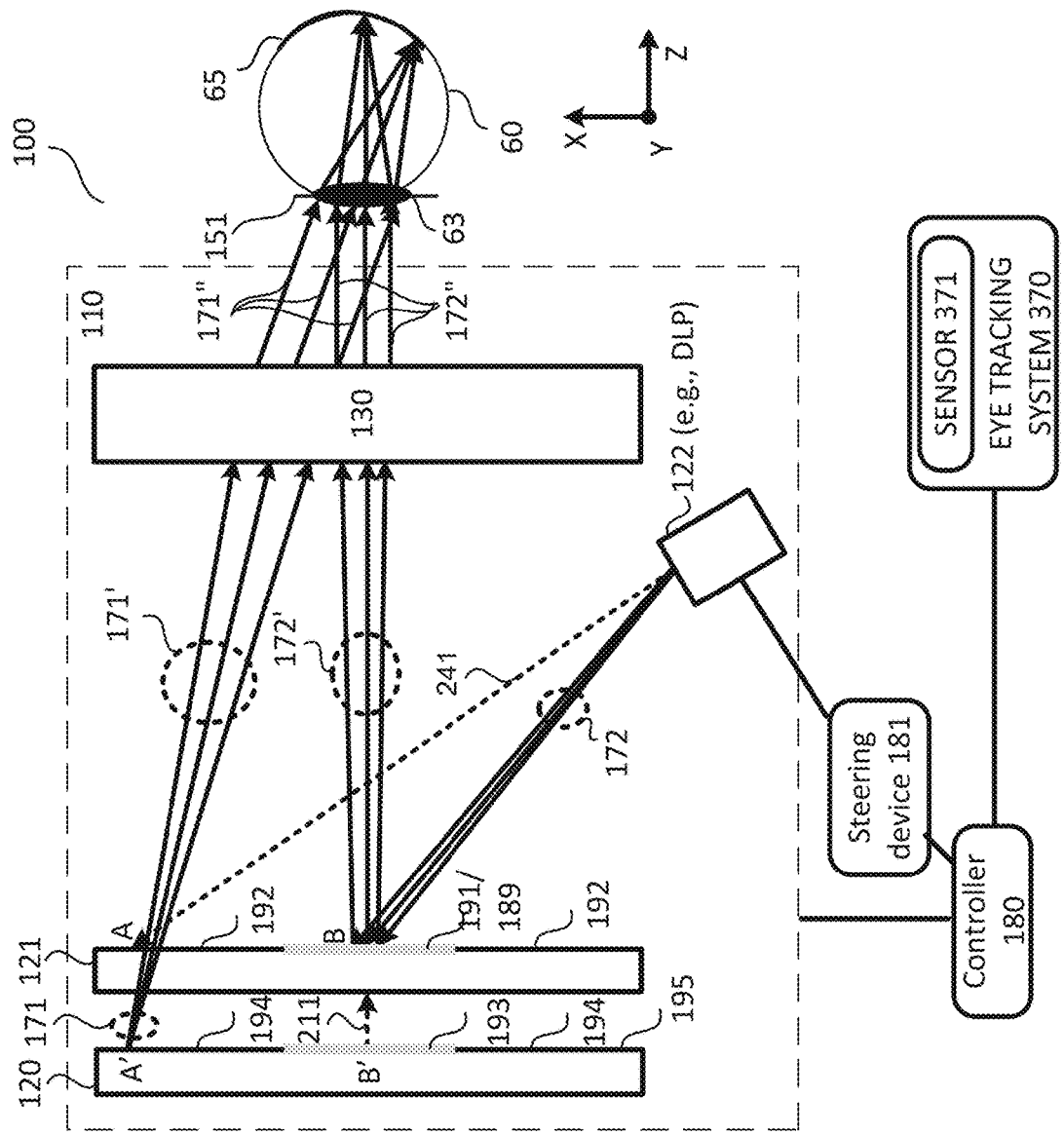
FIGS. 2A-2B show a display system in a side view according to some aspects of the disclosure.

The disclose is related to virtual reality displays, and describes methods and display systems that may generate an image having variable resolutions or variable pixel densities based on gaze of a user. When the gaze changes, areas corresponding to central vision and periphery vision may change, and the area having the high resolution is controlled to be positioned substantially within the new central vision.

The display system described in the disclosure may dynamically provide high-resolution imagery to be within the central vision of the user and lower resolution imagery to be within the peripheral vision using a combination of display technologies, including a switchable liquid crystal panel that may alternate between reflective and transparent states.

A display system may be characterized by a resolution or a pixel density indicated by pixels-per-degree (PPD) that may be referred to as a PPD pixel density or PPD. The PPD pixel density may indicate how many pixels are perceived per degree of a field of view (FOV) of the display system. In an example, a user of the display system perceives a virtual environment as being more detailed and realistic as the PPD increases. In an example, the display system is a virtual reality (VR) display system, for example, that directs computer-generated content to an eye of the user.

In an aspect, for an eye of the user of the display system, visual acuity that indicates clarity or sharpness of vision may decrease with an eccentricity that refers to an angular distance from a center of a visual field of the eye. FIG. 1A shows examples of different visions according to an aspect of the disclosure. An eye (60) of a user of a display system may include a lens (63) and a retina (65). Light rays may enter the eye (60) in different directions and may be focused by the lens (63) onto different areas of the retina (65) including a foveola of the retina (65) and other areas. A vision may be classified based on a direction of a light ray (143). The light ray (143) may form an angle $\alpha$ between the direction of the light ray (143) and a gaze direction (141).

The vision may be classified based on the angle $\alpha$. In an aspect, the vision may be classified into central vision (or a central vision field) (145) and peripheral vision (or a peripheral vision field) based on the angle $\alpha$ and a threshold angle $\alpha_0$. The vision may be referred to as the central vision (145) when $\alpha \leq \alpha_0$. Light rays entering the eye (60) within the central vision (145) may form images near or at the foveola of the retina (65) where the eye (60) has a high visual acuity and thus may see clearly in the central vision (145). The vision may be referred to the peripheral vision when $\alpha > \alpha_0$. Light rays entering the eye (60) in the peripheral vision may form images in areas different from the foveola of the retina (65) where the eye (60) has a low visual acuity and may not see clearly in the peripheral vision. A value of the threshold angle $\alpha_0$ can depend on optical components of the display system, requirements of the application, the eye (60), and/or the like. The angle $\alpha_0$ can be selected as a suitable angle between 0° and 90°. In an example, the angle $\alpha_0$ is approximately 9°, 30°, or the like.

Increasing the FOV and the PPD of the display system may be beneficial. However, increasing the FOV may reduce the PPD and increasing the PPD may decrease the FOV, for example, if other viewing conditions and a display resolution (e.g., a number of pixels per unit length) of a display screen remains the same. As described above, the visual acuity in the peripheral vision of the eye (60) is less than the visual acuity in the central vision (145). Considering visual acuity can benefit designs of the display system. According to an aspect of the disclosure, the display system may be configured to have multiple resolutions (e.g., multiple PPDs) corresponding to different vision fields. In an aspect, a resolution (e.g., a PPD) of the display system corresponding to the peripheral vision can be lower than a resolution (e.g., a PPD) of the display system corresponding to the central vision, and thus matching the resolutions (e.g., the PPDs) of the display system with the vision fields of the eye of the user of the display system. Accordingly, the resolution (e.g., the PPD) corresponding to the central vision and the entire FOV may increase without using a display device having a higher resolution (e.g., a higher pixels-per-inch (PPI)). Thus, a more immersive and visually satisfying experience may be created by increasing the PPD (e.g., 40 PPD, 60 PPD, or the like) within the central vision (145) where the eye (60) is focused or gazes, while maintaining a lower PPD (e.g., 20 PPD) in the peripheral vision where the eye (60) is less sensitive to detail.

FIG. 1B shows an example of a display system (100A) having a single PPD (e.g., a first PPD) according to an aspect of the disclosure. FIG. 1C shows an example of a display system (100B) having multiple PPDs (e.g., the first PPD and a second PPD) according to aspects of the disclosure. A gaze direction is indicated by a line (197) in FIGS. 1B-1C.

Referring to FIG. 1B, the display system (100A) includes a display device that is configured to generate an image (198) having a pixel density indicated by pixels-per-unit length such as PPI. An FOV of a display system or a light receiver can indicate an extent that is detected by a light receiver (e.g., the eye (60)) in the display system. In an example, the FOV is indicated by a solid angle within which the light receiver can detect or receive light. In an example, the FOV is indicated by a horizontal FOV, a vertical FOV, or the like such as shown in FIGS. 1B-1C. Referring to FIGS. 1B-1C, the FOV of the display system (100A) and the FOV of the display system (100B) are identical, and may be indicated by an angle $\Omega_1$ which, for example, is a horizontal FOV or a vertical FOV. In an example, light rays between boundaries (153)-(154) may enter the light receiver (e.g., the eye (60)).

Referring to FIG. 1B, the first PPD may be determined based on the FOV $\Omega_1$ and a number of pixels $N_1$ across $\Omega_1$. For example, the first PPD is equal to $N_1/\Omega_1$.

Referring to FIG. 1C, the display system (100B) includes a display device that is configured to generate an image (298). In an example, the image (298) has the first PPD (e.g., $N_1/\Omega_1$) and a first PPI. Another display device may generate an image (199) having the second PPD and a second PPI. The second PPD may be determined based on a FOV $\Omega_2$ and a number of pixels $N_2$ across $\Omega_2$. For example, the second PPD is equal to $N_2/\Omega_2$. In an example, the second PPD is higher than the first PPD, for example, the second PPD is 1.5 or 2 times of the first PPD.

In the example shown in FIG. 1C, resolutions of the high resolution image (199) and the low resolution image (298) may be indicated by PPDs or PPIs as respective distances between the images (199) and (298) and the eye (60) are identical (e.g., d1). In the example shown in FIG. 1C, a ratio of the first PPD over the second PPD is identical to a ratio of the first PPI over the second PPI.

Referring to FIG. 1C, in an aspect, multiple images (e.g., the images (298) and (199)) having different PPDs may be combined to form a single image (196). The single image (196) can include a first portion (e.g., the image (298)) having the first PPD and a second portion (e.g., the image (199)) having the second PPD. In an example, the first portion of the image (196) is substantially positioned within the central vision of the eye (60), for example, $\Omega_1/2 \leq \alpha_0$, and the second portion of the image (196) is substantially positioned within the peripheral vision of the eye (60).

In an example, a position of the image (199) within an XY plane is adjusted based on the gaze direction (197) of the eye (60) such that the image (199) may be substantially within the central vision of the eye (60) when the gaze direction (197) changes. The XY plane includes an X axis and a Y axis that is orthogonal to the X axis. Thus, when the gaze direction (197) changes, the areas corresponding to the central vision and the periphery vision change accordingly, and thus the new central vision has the high PPD. The display system (100B) can dynamically provide high-resolution imagery to the central vision of the user and lower resolution to the peripheral vision using a combination of display technologies, including, for example, a switchable liquid crystal (LC) panel (also interchangeably referred to as a dual state LC panel) that may alternate between two states (e.g., a reflective state and a transparent state).

FIG. 2A shows a display system (e.g., a near eye display system) (100) in a side view according to some aspects of the disclosure. The display system (100) includes an optical system (110), an eye tracking system (370) configured to detect information indicating a gaze direction of the eye (60), and a controller (180). The controller (180) may be coupled to the eye tracking system (370) and various components in the optical system (110). In an example, the controller (180) includes processing circuitry configured to control the operations of the optical system (110) and the eye tracking system (370). The optical system (110) can include a display device (e.g., a projector) (122), a display device (also interchangeably referred to as a display panel) (120), a dual state LC panel (121), and a viewing optical system (130). In an example, the viewing optical system (130) is a virtual reality (VR) viewing optical system (130) used in VR applications.

FIGS. 3A-3C and 4A-4C show examples of a top view of various images and the dual state LC panel (121) according to some aspects of the disclosure.

Figure 2B:
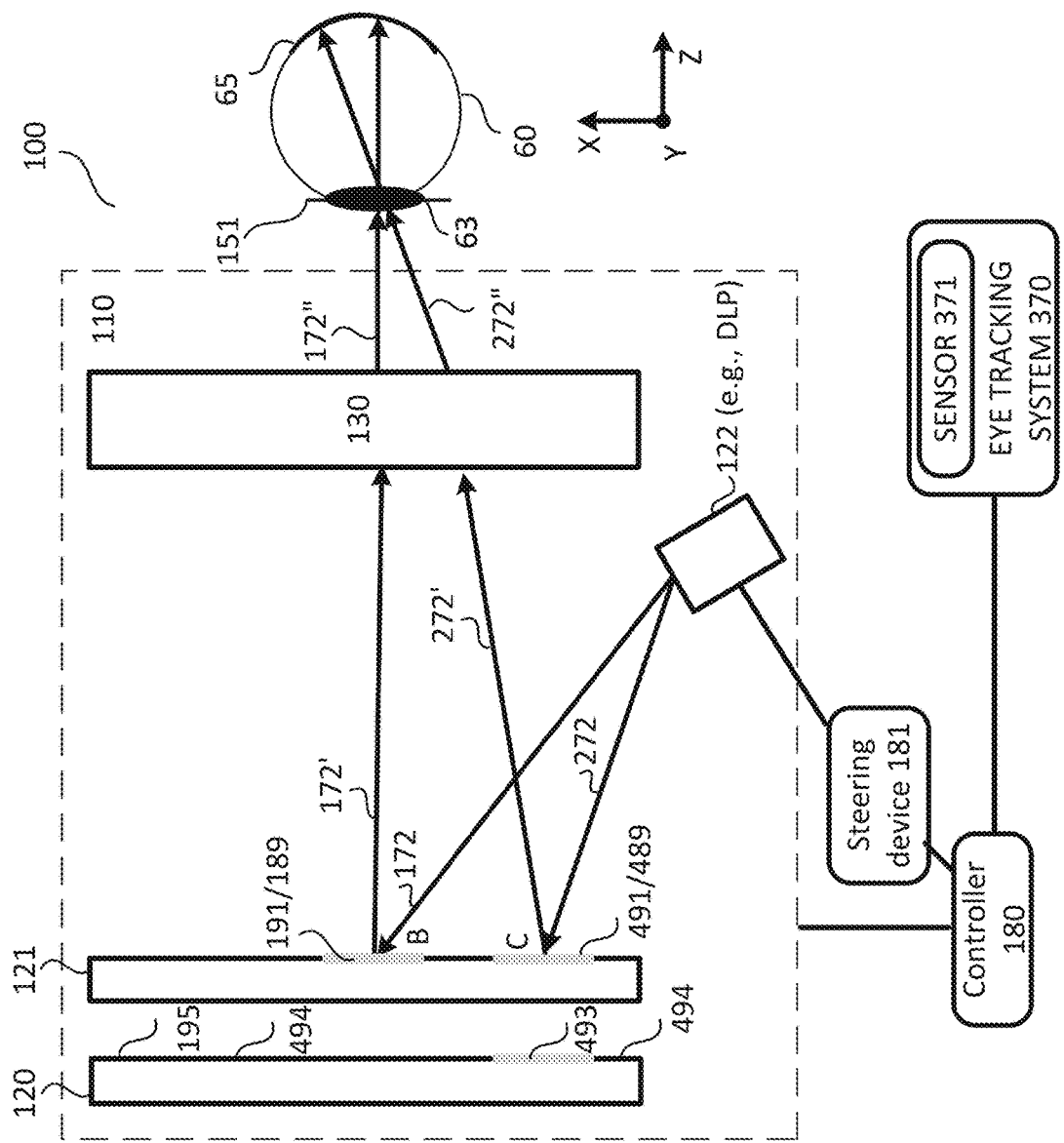
Figure 3A:
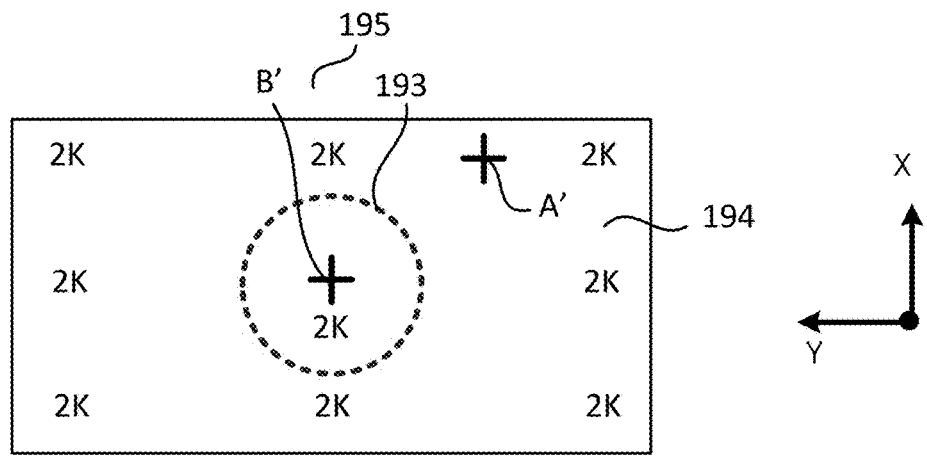
FIGS. 3A-3C and 4A-4C show examples of a top view of various images and a dual state liquid crystal (LC) panel according to some aspects of the disclosure.
Figure 3B:
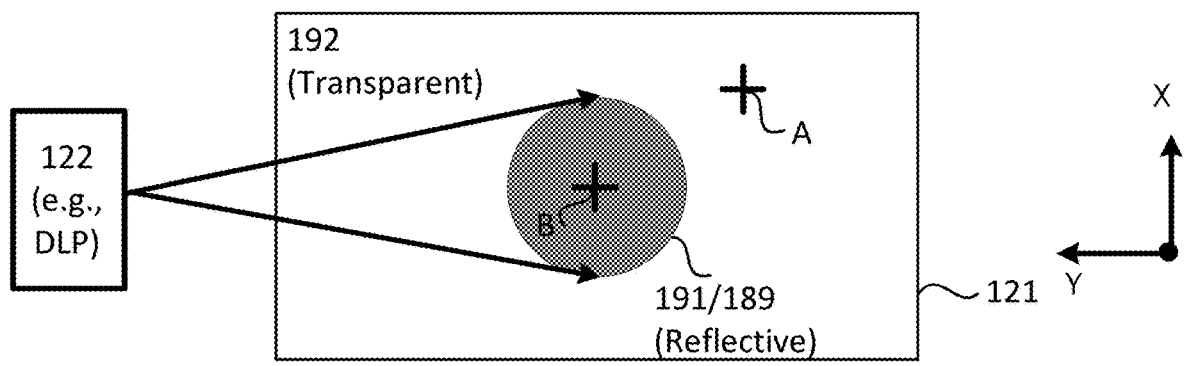
Figure 3C:
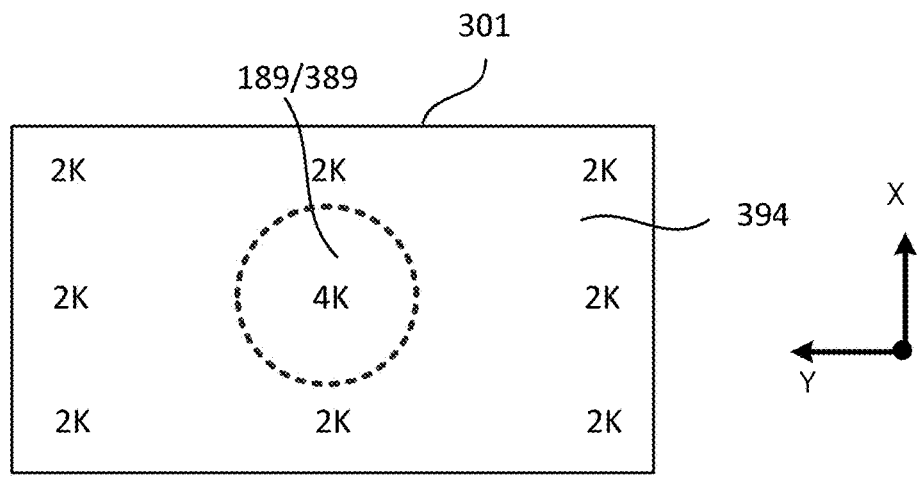

In an example, referring to FIGS. 2, 3B, and 3C, the display device (122) is a projector (e.g., a digital light processing (DLP) projector) configured to project light beams on a first region (191) of the dual state LC panel (121) to form a first image (189) on the first region (191) of the dual state LC panel (121). The projector (e.g., the DLP projector) (122) may generate (e.g., project) a super-high-resolution image (e.g., an image with the second PPD) onto the dual state LC panel (121) that is in the reflective state.

In an example, the super-high-resolution image (or the super resolution image) has a 4K resolution (4K). The 4K resolution may refer to a display resolution of approximately 4,000 pixels, for example, along the horizontal direction. 4K may include a resolution of 3840×2160 pixels, a resolution of 4096×2160 pixels, or the like. 4K may include approximately 8 million pixels. In an example, a 2K resolution may refer to a display resolution of approximately 2,000 pixels, for example, along the horizontal direction. 2K may include a resolution of 2048×1080 pixels, a resolution of 1920×1080 pixels, or the like. 2K may include approximately 2 million pixels.

In an example, the projector (122) is a DLP projector. The DLP projector (122) may project light beams through a color wheel, reflection mirrors, and a lens. The image can be generated by microscopically small mirrors laid out in a matrix on a semiconductor chip (e.g., a digital micromirror device (DMD)). The mirrors can be repositioned rapidly to generate the image. In an example, the mirrors are so small that DMD pixel pitch may be approximately 5.4 µm or less. Each mirror may represent one or more pixels in the projected image. In an example, each mirror may represent one pixel in the projected image. The number of mirrors may correspond to the resolution of the projected image. For example, a 2K DLP projector has about 2.2 million mirrors. A 4K DLP projector has about 8.8 million mirrors.

In an aspect, a projection orientation of the projector (122) (e.g., the DLP projector) can be quickly and accurately controlled by an actuator (e.g., a mechanical actuator) to adapt to the change of the gaze direction. For example, as the gaze direction changes from the first gaze direction (e.g., parallel to the light beam (172")) to the second gaze direction (e.g., parallel to the light beam (272")), the projection orientation of the projector (122) changes from an orientation associated with the light beam (172) to an orientation associated with the light beam (272). In an example, the reposition or movement of the mirrors in the projector (122) is faster than the projection orientation change of the projector (122).

Referring to FIG. 3B, a location (e.g., a location in the XY plane), a size, and a shape of the first image (189) may be identical (or substantially identical) to a location (e.g., a location in the XY plane), a size, and a shape of the first region (191), respectively. Referring to FIGS. 2 and 3B, the location of the first image (189) and the first region (191) is indicated by a center location B of the first region (191) in the XY plane. In the example shown in FIG. 3B, the shape of the first image (189) is circular. The shape of the first image (189) can be any suitable shape including a circular shape, a rectangular shape, an oval shape, an irregular shape, or the like. In an example, the dual state LC panel (121) can be controlled such that the shape of the first region (191) may match the shape of the first image (189).

According to an aspect of the disclosure, the location of the first region (191) on the dual state LC panel (121) may be determined based on a gaze direction of an eye (60) of a user of the display system (100). The projector may be controlled to project the light rays across the first region (191) on the dual state LC panel (121), for example, a projection pattern including projection directions for the light rays and/or projection positions where the light rays intercept with the dual state LC panel (121) may be controlled based on the gaze direction or the location of the first region (191) on the dual state LC panel (121).

In an example, operations of the dual state LC panel (121) and the projector (122) are coupled, and thus may be synchronized, for example, by the controller (180). The controlled (180) is configured to control the dual state LC panel (121) and the projector (122) based on the gaze direction.

The display device (120) can include a pixel array configured to emit light beams associated with respective pixels in the pixel array and display images. In an example, referring to FIGS. 2 and 3A, the display device (120) is configured to display a second image (195) including a first portion (193) and a second portion (194) that is outside the first portion (193). The first portion (193) and the second portion (194) of the second image (195) may correspond to the first region (191) and the second region (192) on the dual state LC panel (121), respectively. In an example, the second image (195) has a first PPD, e.g., corresponding to a standard resolution such as the 2K resolution indicated in FIG. 3A.

In an example, referring to FIGS. 2 and 3A-3B, the location (e.g., the location B in the XY plane), the size, and the shape (e.g., a circular shape) of the first region (191) may be identical to a location (e.g., a location B' in the XY plane), a size, and a shape (e.g., a circular shape) of the first portion (193) of the second image (195), respectively. A location (e.g., a location in the XY plane), a size, and a shape of the second region (192) may be identical to a location (e.g., a location in the XY plane), a size, and a shape of the second portion (194) of the second image (195), respectively.

In some examples, the pixel array includes multiple pixels arranged to form a two-dimensional surface. The two-dimensional surface of the display device (120) can be substantially flat or planar (e.g., parallel to the XY plane), can be curved, or can include a combination of flat and planar panels. The display device (120) can be a display panel. The display device (120) can include any suitable type(s) of display panel(s), such as a liquid crystal display (LCD) panel(s), an organic light emitting diode (OLED) panel(s), and/or the like. A resolution of the display device (120) can be defined according to pixels in the two dimensions or one of the two dimensions of the two-dimensional surface. Each pixel in the pixel array can generate a light beam. Each light beam can include a bundle of light rays in any suitable direction. For example, referring to FIG. 2A, the pixel A' on the display device (120) emits a light beam including a bundle of light rays in suitable directions. The light rays (171) that is a subset of the bundle of light rays can be directed by the viewing optical system (130) to the area (151).

The dual state LC panel (121) may be disposed between the projector (122) and the display device (120). The dual state LC panel (121) may be configured to operate in a dual state. In the dual state, the dual state LC panel (121) may include the first region (191) and the second region (192) that is outside the first region (191). The first region (191) on the dual state LC panel (121) may be configured (e.g., controlled by the controller (180)) to reflect the projected light beams from the projector (122). In an example, the first region (191) on the dual state LC panel (121) may be configured to block (e.g., substantially block) light beams from the display device (120) (e.g., light beams (211) from the first portion (193)). Referring to FIGS. 2 and 3A, the light beams (211) (indicated by a dashed line in FIG. 2A) emitted from a pixel that is located at the position B' are blocked or are substantially blocked by the first region (191), and thus do not enter the eye (60). Similarly, the light beams from other pixels in the first portion (193) are blocked or are substantially blocked by the first region (191), and thus do not enter the eye (60).

In the dual state, the second region (192) on the dual state LC panel (121) may be configured (e.g., controlled by the controller (180)) to transmit light beams from the display device (120). Thus, in an example, when the dual state LC panel (121) operates in the dual state, the first region (191) of the dual state LC panel (121) is configured to reflect the first image (189) formed by the projector (122), and the second region (192) on the dual state LC panel (121) is configured to transmit the second image (195) displayed by the display device (120).

In an example, when the dual state LC panel (121) operates in the dual state, the first region (191) of the dual state LC panel (121) is configured to block (or substantially block) the first portion (193) of the second image (195) displayed by the display device (120), and the second region (192) on the dual state LC panel (121) is configured to transmit the second portion (194) of the second image (195) displayed by the display device (120).

Referring to FIG. 3C, multiple images (e.g., a reflected image (389) of the first image (189) and a transmitted image (394) of the second portion (194)) may be combined to form a single image (301) on the dual state LC panel (121). For example, the combined image (301) may be formed using (i) the reflected image (389) of the first image (189) and (ii) the transmitted image (394) of the second portion (194). In an example, the second image (195) has a first PPD (e.g., corresponding to a standard resolution such as the 2K resolution) that is less than a second PPD e.g., corresponding to a super resolution such as the 4K resolution) of the first image (189), and thus the transmitted image (394) of the second portion (194) has the first PPD (e.g., 2K) that is less than the second PPD (e.g., 4K) of the reflected image (389). Accordingly, the single image (301) includes different portions having different PPDs (e.g., 2K and 4K).

In an example, the reflected image (389) is substantially identical to the first image (189). For example, pixel intensities of the reflected image (389) may be scaled based on respective pixel intensities of the first image (189). In an example, the transmitted image (394) is substantially identical to the second portion (194) of the second image (195). For example, pixel intensities of the transmitted image (394) may be scaled based on respective pixel intensities of the second portion (194). In an example, a polarization state of the transmitted image (394) may be different from that of the second portion (194). In an example, the first image (189) includes an image of the second PPD and the first portion (193) includes the image of the first PPD. For example, the first image (189) (with the second PPD) and the first portion (193) (with the first PPD) of the second image (195) have an identical display pattern on the XY plane with different PPDs.

The viewing optical system (130) can be configured to modify the light beams (e.g., including reflected light beams of the first image (189) and transmitted light beams of the second image (195) (e.g., transmitted light beams of the second portion (194) of the second image (195)) from the dual state LC panel (121), and to direct the modified light beams to an area (151). In an example, the area (151) is located in the XY plane, and may be referred to as an exit pupil of the optical system (110). A light receiver or detector, such as an eye of a user or the like, can be located at the area (151). The viewing optical system (130) can be configured to modify and direct the light beams from the reflected image (389) and the light beams from the transmitted image (394) onto different areas of a retina of the eye of the user of the display system. Thus, the viewing optical system (130) can be configured to form an image on the retina (65) from the combined image (301). In an example, the reflected image (389) having a higher PPD (e.g., the second PPD) is substantially within the central vision of the eye (60), and the light beams from the reflected image (389) may be directed to form a portion of an image substantially within the foveola of the retina (65) of the eye (60) where the eye (60) has a high vision acuity. The transmitted image (394) having a lower PPD (e.g., the first PPD) is substantially within the peripheral vision of the eye (60), and the light beams from the transmitted image (394) may be directed to form a portion of the image substantially outside the foveola of the retina (65) of the eye (60) where the eye (60) has a low vision acuity.

In some examples, the viewing optical system (130) can include diffractive elements (e.g., gratings and prisms), refractive elements (e.g., lenses), guiding elements (e.g., planar waveguides and/or fibers), and polarizing elements (e.g., polarizers, half-wave plates, quarter-wave plates, polarization rotators, and the like). In an example, the viewing optical system (130) includes refractive optical elements (ROEs) such as one or more lenses. Each of the one or more lenses can have any suitable thicknesses and/or shapes (e.g., spheric shapes, aspheric shapes, and/or the like).

Referring to FIG. 2A, the optical system (110) can be configured to be positioned within a distance threshold (e.g., 35 mm) of the eye (e.g., the eye (60)) of the user, and the display system (100) can be referred to as a near eye display (NED) system. For example, the display system (100) is a head mounted display (HMD) system worn by the user. Various components in an eye, such as a cornea, a lens, and the like, can manipulate light into the eye to form an image. For purposes of brevity, an image formation function of the various components is represented by a lens (e.g., the lens (63)) of the eye. In an example, the lens (63) is located at the area (151), and the light rays entering the lens (63) form an image on the retina (65) of the eye (60).

The gaze direction can be determined using any suitable method and by any suitable apparatus or system. In an example, the eye tracking system (370) is configured to determine the gaze direction (e.g., an eye looks in the gaze direction) of the eye (60) of the user of the display system (100). The eye tracking system (370) can determine the gaze direction of the eye (60) using (i) optical methods and optical components and/or (ii) non-optical methods and non-optical components. The eye tracking system (370) can include a sensor (371) such as a camera (e.g., an infrared camera) that can detect or obtain information such as eye movement, eye positions, and/or the like that can indicate the gaze direction. In an example, light, including infrared light, is reflected from the eye (60) and sensed by the sensor (371) such as a camera. The information can be analyzed to extract eye rotation from changes in reflections. Video-based eye trackers can use (i) the corneal reflection and the center of the pupil as features to track over time; (ii) reflections from the front of the cornea and the back of the lens as features to track; and/or the like and can determine the gaze direction. In an example, features from inside the eye such as the retinal blood vessels can be imaged and followed as the eye (60) rotates, and the gaze direction can be determined. The eye tracking system (370) and/or the controller (180) can determine the gaze direction based on the information detected by the sensor. In an example, the eye tracking system (370) determines a gaze vector of the eye (60), such as a coordinate (x, y) on the dual state LC panel (121) as the gaze direction and informs the dual state LC panel (121) where to switch between the reflective state and the transparent state.

In an example, the controller (180) (e.g., the processing circuitry in the controller (180)) is configured to determine the gaze direction, for example, based on the information detected by the sensor (371). In an example, the sensor (371) is configured to generate gaze direction information indicating the gaze direction of the eye (60). The controller (180) (e.g., the processing circuitry in the controller (180)) may be configured to determine the location of the first region (191) within the dual state LC panel (121) based on the gaze direction. In an example, referring to FIG. 2A, the location of the first region (191) is determined based on the gaze direction of the eye (60) such that the first region (191) and the first image (189) are within or are substantially within the central vision of the eye (60). In an aspect, the location of the first region (191) and the first image (189) within the dual state LC panel (121) can be dynamically changed by the controller (180), for example, in response to a change in the gaze direction of the eye (60). When the gaze direction of the eye (60) changes, the areas such as the first region (191) and the second region (192) corresponding to the central vision and the periphery vision, respectively, change accordingly. Thus, when the gaze direction of the eye (60) changes, the locations of the first region (191) and the first image (189) change accordingly, and the reflected image (389) that has a higher PPD than that of the transmitted image (394) may be imaged to an area that is the foveola area or substantially overlaps with the foveola area. The transmitted image (394) having a lower PPD may be imaged to an area that is outside the foveola area or is substantially outside the foveola area.

Referring to FIG. 3C, the display system (100) may generate a super resolution image (e.g., the reflected image (389)) within a circular area that may be achieved through reflection of the projected light beams from the projector (122), while the peripheral vision is provided by a background display (e.g., the transmitted image (394)).

FIGS. 2B, 3A-3C, and 4A-4C show an example of changing the location of the first region in the dual state LC panel (121) and changing the location of the image formed by the projector (122) based on the gaze direction of the eye (60) according to an aspect of the disclosure. FIG. 2A shows an example of changing projection directions of light beams from the projector (122) based on the gaze direction according to an aspect of the disclosure. FIGS. 2A and 3B shows the location of the first region (191) in the dual state LC panel (121) and the location of the first image (189) corresponding to a first gaze direction of the eye (60), for example, that is parallel to the Z axis (e.g., focused on the location B of the dual state LC panel (121)). In an example, the location B is at a center of the first region (191), and can also be used to represent the location of the first region (191) and the first image (189).

Figure 4A:
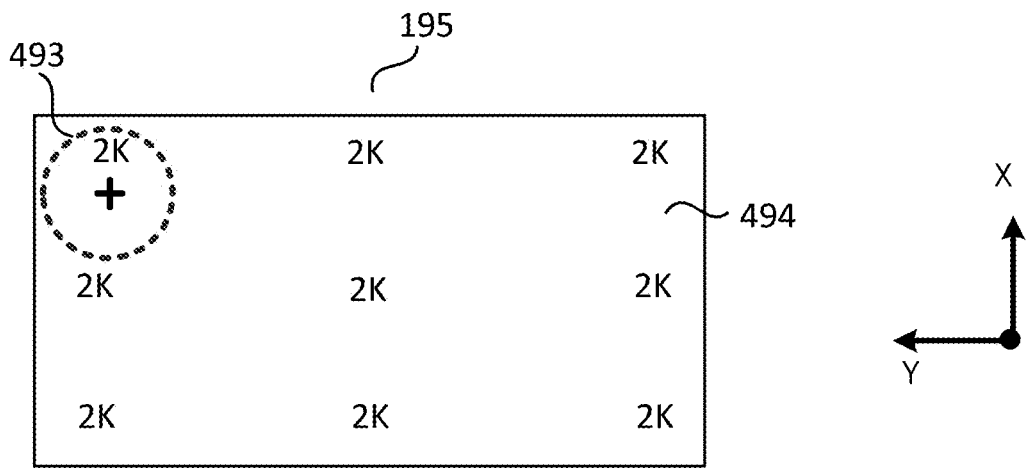
Figure 4B:
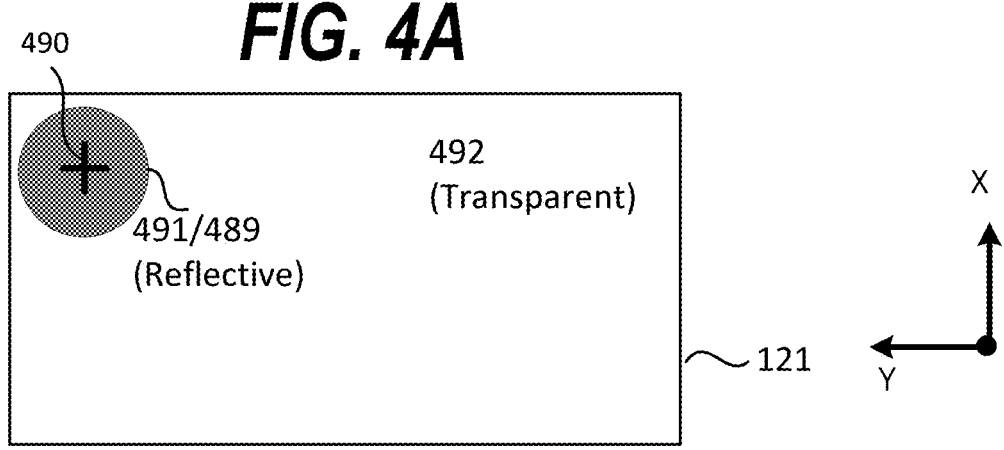

Referring to FIGS. 2B, 3B, and 4B, when the gaze direction changes from the first gaze direction to a second gaze direction (e.g., parallel to a light beam (272")), for example, that is focused on a location (490) (e.g., a location C in FIG. 2B) of the dual state LC panel (121), the location of the first region on the dual state LC panel (121) is changed from the location B to the location (490), and the first region is referred to as the first region (491). Referring to FIG. 4B, the dual state LC panel (121) can include the first region (491) and a second region (492) that is outside the first region (491). For purposes of clarity, FIG. 2B does not show the second region (492). Instead, FIG. 2B shows the first region (191) corresponding to the first gaze direction and the first region (491) corresponding to the second gaze direction.

Referring to FIGS. 2B and 4A, the second image (195) may include a first portion (493) that corresponds to the first region (491) and a second portion (494) that corresponds to the second region (492). The descriptions of (491)-(494) in FIGS. 4A-4B are similar or identical to the descriptions of (191)-(194) described in FIGS. 3A-3B.

Figure 4C:
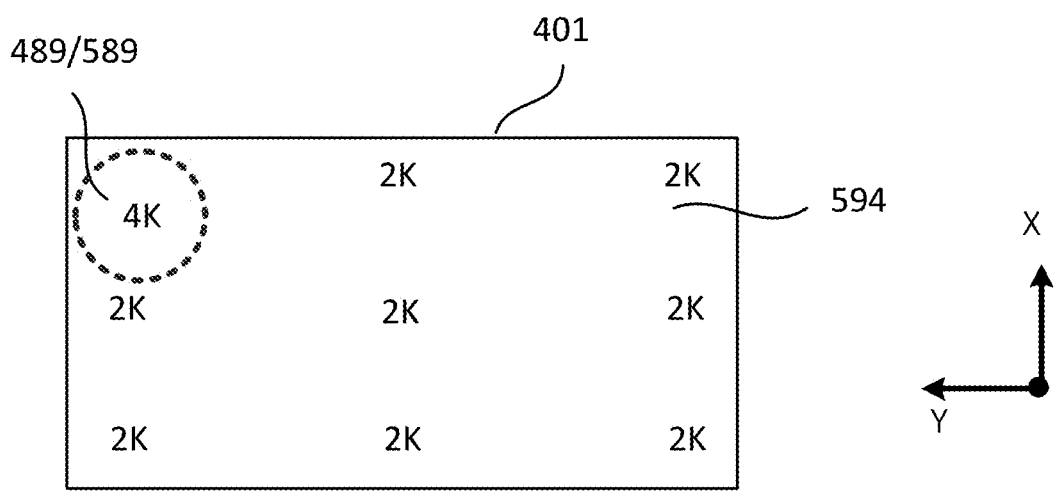

As the gaze direction changes from the first gaze direction to the second gaze direction, the projector (122) is configured to project the light beams across the first region (491) in the dual state LC panel (121) and form an image (489) as shown in FIGS. 2B and 4B-4C. For example, a light beam (272) from the projector (122) is incident onto the location C in the first region (491). Similarly as described in FIG. 2A, the light beam (272) is reflected by the first region (491) and becomes a reflected light beam (272'). The viewing optical system (130) may modify the reflected light beam (272') as a light beam (272"). The light beam (272") may enter the eye (60), for example, along the gaze direction. Other light beams from the projector (122) may be incident onto and reflected by the first region (491), pass through the viewing optical system (130), and enter the eye (60) forming angles ≤α₀ with the second gaze direction.

The image (489) may be reflected by the first region (491) of the dual state LC panel (121) as a reflected image (589). The second portion (494) of the second image (195) can be transmitted through the second region (492) of the dual state LC panel (121) as the transmitted image (594). Thus, the reflected image (589) and the transmitted image (594) can be combined on the dual state LC panel (121) to form a single image (401) as shown in FIG. 4C. Similarly as described above, the viewing optical system (130) can be configured to form an image on the retina (65) from the combined image (401). In an example, the reflected image (589) having a higher PPD (e.g., the second PPD corresponding to the 4K resolution) is substantially within the central vision of the eye (60), and the light beams from the reflected image (589) may be directed to form a portion of an image substantially within the foveola of the retina (65) of the eye (60) where the eye (60) has a high vision acuity. The transmitted image (594) having a lower PPD (e.g., the first PPD corresponding to the 2K resolution) is substantially within the peripheral vision of the eye (60), and the light beams from the transmitted image (594) may be directed to form a portion of the image substantially outside the foveola of the retina (65) of the eye (60) where the eye (60) has a low vision acuity.

The controller (180) (e.g., the processing circuitry in the controller (180)) may be configured to control the dual state LC panel (121) to operate in the dual state such as described above. The controller (180) (e.g., the processing circuitry in the controller (180)) may be configured to control the projector (122) to project the light beams across the first region (e.g., (191) or (491)) in the dual state LC panel (121), for example, via an actuator or a steering device (e.g., a fast steering device) (181) such as MEMS controlled mirrors.

In some examples, during operation, the gaze direction of the eye (60) may be determined, for example, by the eye tracking system (370) and/or the controller (180) based on the information detected by the sensor (371). The location of the first region (191) within the dual state LC panel (121) may be determined based on the gaze direction, for example, by the controller (180). The dual state LC panel (121) may be controlled, for example, by the controller (180) to operate in the dual state where the first region (191) on the dual state LC panel (121) may be electrically controlled to function in a first state and the second region (192) on the dual state LC panel (121) may be electrically controlled to function in a second state that is different from the first state.

The projector (122) may be controlled, for example, by the controller (180) to project the light beams on the first region (191) on the dual state LC panel (121) to form the first image (189) on the dual state LC panel (121). When the first region (191) on the dual state LC panel (121) functions in the first state, the first region (191) may reflect the light beams from the projector (122), and thus reflect the first image (189). In an example, a light beam (172) including a plurality of light rays from the projector (122) are incident onto the location B on the dual state LC panel (121). In an example, the light beam (172) has a relatively small angular spread (e.g., a small beam divergence), for example, when the projector (122) is a DLP projector. A polarization or a polarization state of the light beam (172) may be controlled to be any suitable polarization state, such as a linear polarization.

The dual state LC panel (121) may be configured to switch between the first state (e.g., a reflective state) for a high-resolution central imagery and the second state (e.g., a transparent state) allowing a peripheral imagery from the display device (120) to be seen by the eye (60).

The light beam (172) may be reflected by the first region (191) as a reflected light beam (172'), which is modified and directed by the viewing optical system (130) toward the eye (60) as the light beam (172"). In an example, light rays in the light beam (172") become collimated (e.g., parallel to each other) after passing through the viewing optical system (130), and may be focused on the retina (65). The location B may be any location within the first region (191). According to an aspect of the disclosure, an angle between the collimated light rays (172") and the gaze direction is less than or equal to the threshold angle $\alpha_0$, and thus the first image (189) may be within the central vision of the eye (60), and a corresponding image is formed within the area (e.g., the foveola) of the retina (65) that has a relatively high visual acuity.

When the first region (191) on the dual state LC panel (121) functions in the first state, the first region (191) may block or may substantially block the light beams from the display device (120). Referring to FIGS. 2 and 3A, the light beam (211) emitted from the pixel B' that is located at the same position as the location B in the XY plane is blocked or is substantially blocked by the first region (191), and thus do not enter the eye (60). Similarly, the light beams from other pixels in the first portion (193) are blocked or are substantially blocked by the first region (191), and thus do not enter the eye (60).

When the second region (192) on the dual state LC panel (121) functions in the second state, the second region (192) may transmit or may substantially transmit the light beams from the display device (120). Referring to FIGS. 2A and 3A-3C, the light beam (171) emitted from a pixel A' of the image (195) transmit or substantially transmit through the second region (192) as the transmitted light beam (171'). Light rays in the transmitted light beam (171') become the collimated light beam (171") (e.g., parallel to each other) after passing through the viewing optical system (130). The collimated light beam (171") enter the eye (60), and may be focused onto the retina (65). According to an aspect of the disclosure, an average angle between the rays of the collimated light beam (171") and the gaze direction is larger than the threshold angle $\alpha_0$, and thus the transmitted image (394) may be or may be substantially within the peripheral vision of the eye (60), and a corresponding image is formed within the area of the retina (65) that has a relatively low visual acuity.

In an example, a projection range of the projector (122) is confined to be within the first region (191) such that the projector (122) is configured to project the light beams within the first region (191), and is configured not to project the light beams in the second region (192).

In an example, the projection range of the projector (122) may be slightly larger than the first region (191), for example, may include a small area in the second region (192) that is close to a boundary between the first region (191) and the second region (192). When the second region (192) on the dual state LC panel (121) functions in the second state, the light beams from the projector (122) may pass through the second region (192) (e.g., traveling toward the display device (120) in FIG. 2A), and thus may not enter the eye (60).

Thus, the dual state LC panel (121) may operate in the dual state and the location of the first region within the dual state LC panel (121) is changed based on the gaze direction, for example, in real-time (e.g., simultaneously or with relatively small delay). Further, the projector (122) may be controlled to project the light beams across the first region on the dual state LC panel (121), for example, the projection pattern of the light beams may be controlled based on the gaze direction such that the light beams are projected across the first region (191). Accordingly, the first image (189) with the high PPD is within the central vision of the eye (60) or substantially overlaps with the central vision of the eye (60), and thus may form an image in an area with high visual acuity. On the other hand, the transmitted image (394) with the low PPD may be within the peripheral vision and form an image in an area with low visual acuity.

Referring to FIG. 2A, various components (e.g., the controller (180), the eye tracking system (370), the actuator or the steering device (181), and/or the like) in the display system (100) can communicate using any suitable methods, such as wireless, wired, optical, and/or the like.

In an example, the location of the first region (191) may be determined based on the gaze direction, the optical system (110) including the viewing optical system (130), and/or the like as described below. Referring to FIG. 2A, the first gaze direction is parallel to the Z axis or the light beam 172". The viewing optical system (130) may transform the first gaze direction to a line that is opposite to the light beam (172'). The line and the dual state LC panel (121) may intercept at the location B, which may be the location of the first region (191).

The display system (100) may be used in VR applications, for example, when the first image (189) and the second image (195) are computer-generated content such as generated by the display devices (120) and (122) shown in FIG. 2A.

In some examples, the display system (100) may be used in AR and/or MR applications. For example, light beams from the real world may be combined with the second image (195) shown in FIG. 2A to form an augmented display including the real-world and the second image. The augmented display may transmit through a portion of the second region (192) and subsequently is combined with the first image (189). The image including the augmented display and the first image (189) is directed to the eye (60) by the viewing optical system (130).

Figure 5C:
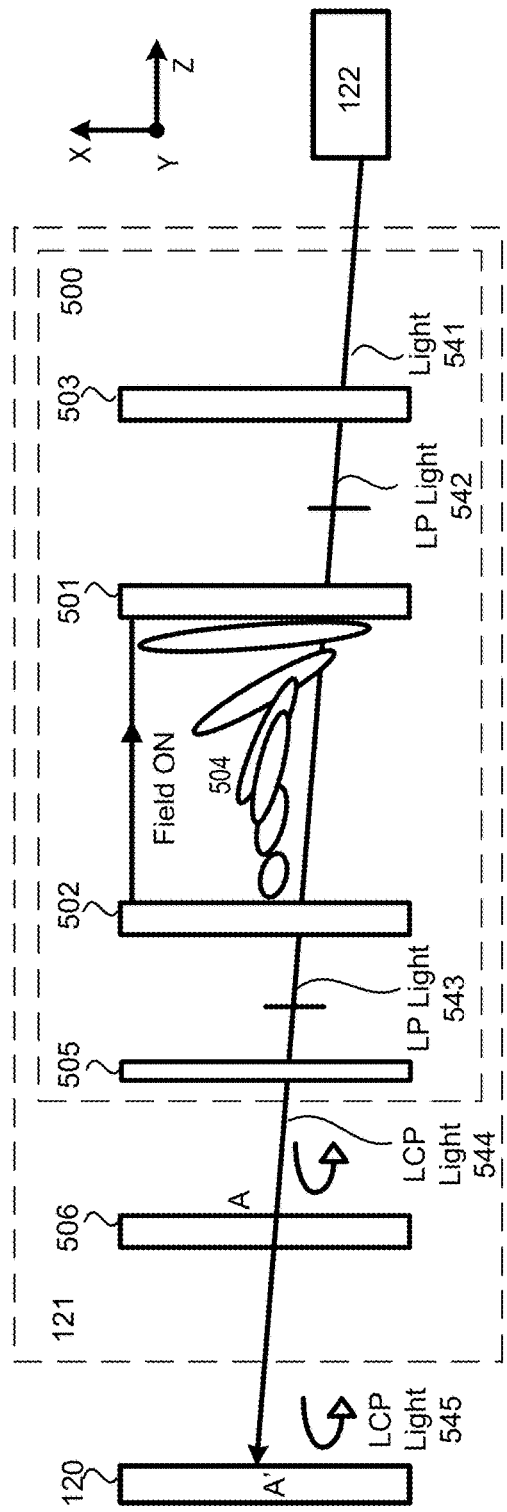

FIGS. 5A-5D show an example of respective portions of the dual state LC panel (121) and operations of the dual state LC panel (121) in the dual state according to an aspect of the disclosure. The components in the dual state LC panel (121) may be identical in FIGS. 5A-5D. According to an aspect of the disclosure, the dual state LC panel (121) may include an LC spatial light modulator (SLM) (500) and an LC layer (506). In an example, such as shown in FIG. 5A, the LC layer (506) is disposed between the LC SLM (500) and the display device (120). In an example, such as shown in FIG. 5B, the LC SLM (500) is disposed between the LC layer (506) and the projector (122).

In an aspect, a light beam is randomly polarized if the light beam includes a rapidly varying succession of different polarization states. A light beam can be polarized, such as linearly polarized (e.g., in a linear polarization state), circularly polarized (e.g., in a circular polarization state), elliptically polarized (e.g., in an elliptical polarization state), or the like. For the linearly polarized light, an electric field vector of the light beam is along a particular line. For the circularly polarized light, an electric field vector of the light beam rotates, e.g., clockwise or counter-clockwise as seen by an observer toward whom the light beam is propagating.

Degree of polarization (DOP) is a quantity that indicates a portion of an electromagnetic wave (e.g., a light beam) that is polarized. A perfectly polarized wave can have a DOP of 100%, and an unpolarized wave can have a DOP of 0%. A partially polarized wave can be represented by a superposition of a polarized component and an unpolarized component, and thus can have a DOP between 0 and 100%. DOP can be calculated as a fraction of a total power that is carried by the polarized component of the wave (e.g., a light beam).

A light beam can have any suitable polarization state(s) and/or DOP. In an example, the light beam is circularly polarized having a DOP of 100%, and the light beam is completely circularly polarized. In an example, the light beam is predominantly circularly polarized having a relatively large DOP that is above a threshold (e.g., 80% or above), such as a superposition of (i) a circularly polarized component and (ii) an unpolarized component and/or another polarization component. A circularly polarized light beam having a DOP of 100% or a predominantly circularly polarized light beam having a relatively large DOP can be referred to as a circularly polarized light beam in the disclosure. In an example, a light beam is linearly polarized having a DOP of 100% or predominantly linearly polarized having a relatively large DOP that is above a threshold. A linearly polarized light beam having a DOP of 100% or a predominantly linearly polarized light beam having a relatively large DOP can be referred to as a linearly polarized light beam in the disclosure.

The LC layer (506) may reflect light beams having a first polarization (e.g., a first circular polarization) and to transmit light beams having a second polarization (e.g., a second circular polarization). Handedness of the first circular polarization may be opposite to handedness of the second circular polarization. In an example, the LC layer (506) includes a polymer-stabilized cholesteric LC (PSCLC) diffuser. For example, circularly polarized light may be approximate 100% reflected if the handedness of the circularly polarized light coincides with the helical chirality of the cholesteric LC and a wavelength of the circularly polarized light is within a reflection band of the cholesteric LC. Light having an opposite circular polarization may be transmitted.

In an example shown in FIGS. 5A-5D, the first circular polarization is right circular polarization (RCP) (interchangeably referred to as right-handed circular polarization (RHCP)), and the second circular polarization is left circular polarization (LCP) (interchangeably referred to as left-handed circular polarization (LHCP)).

In an aspect, the LC SLM (500) may include multiple LC cells that may be individually controlled using electrical signals. Each of the multiple LC cells and a respective portion of the LC layer (506) may be referred to as a dual state LC cell. The dual state LC cell may be configurable to operate in the first state, and thus become a part of the first region in the dual state LC panel (121). The dual state LC cell may be configurable to operate in the second state, and thus become a part of the second region in the dual state LC panel (121). The dual state LC cell may be switched or reconfigurable between operating in the first state or operating in the second state. When a first electrical signal is applied to the dual state LC cell (e.g., applied to the LC cell in the dual state LC cell), the dual state LC cell may operate in the first state and thus may become a portion of the first region in the dual state LC panel (121). When a second electrical signal is applied to the dual state LC cell, the dual state LC cell may operate in the second state and thus may become a portion of the second region in the dual state LC panel (121).

During operation, the first electrical signal may be applied to a first subset of the dual state LC cells, for example, by applying to a first subset of the multiple LC cells and the second electrical signal may be applied to a second subset of the dual state LC cells, for example, by applying to a second subset of the multiple LC cells. Thus, the first subset of dual state LC cells may operate in the first state and become the first region (191) of the dual state LC panel (121), and the second subset of dual state LC cells may operate in the second state and become the second region (192) of the dual state LC panel (121). In an example, the multiple LC cells include the first subset of the multiple LC cells and the second subset of the multiple LC cells. The first subset of the dual state LC cells includes the first subset of the multiple LC cells. The second subset of the dual state LC cells includes the second subset of the multiple LC cells.

The LC SLM (500) may include the first region and the second region that correspond to the first region (e.g., the first region (191)) and the second region (e.g., the second region (192)) of the dual state LC panel (121), respectively. The LC layer (506) may include a first region and a second region that correspond to the first region (e.g., the first region (191)) and the second region (e.g., the second region (192)) of the dual state LC panel (121), respectively.

Referring to FIGS. 5A-5D, the LC cell in the LC SLM (500) may include an LC switch (504), a quarter-wave plate (QWP) (505), a linear polarizer (503), and/or the like. The QWP (505) may be a broadband QWP that is applicable to different wavelengths covering a large wavelength range (e.g., including visible wavelengths). The QWP (505) may convert linear polarized light to circular polarized light. The QWP (505) may convert circular polarized light to linear polarized light.

The LC switch (504) may include LC materials disposed between two electrodes (e.g., ITO) (501) and (502). In an example, the LC materials include twisted nematic (TN) LC materials that are arranged in a 90° twisted configuration, and the LC SLM (500) is referred to as a TN SLM and the LC switch may be referred to as the TN LC switch. Each electrode can be disposed on a respective transparent substrate (e.g., a glass substrate), and each of the labels (501)-(502) may refer to the component that includes the transparent substrate and the respective electrode. The electrodes of the multiple LC cells may be controlled individually using any suitable circuitry or method, such as a passive matrix addressing method, an active matrix addressing method, or the like. In an example, the multiple LC cells are controlled using the active matrix addressing method where a matrix of thin-film transistors is used to control individual LC cells in the LC SLM (500). In an example, an alignment material (e.g., polyimide) is disposed between the TN LC materials and an electrode (e.g., (501)) to align the TN LC material.

The LC SLM (500) can be a polarization modulator or a polarization rotator as the LC SLM (500) can modulate a polarization state of light, such as shown in FIGS. 5A-5D. In an example, the LC SLM (500) may also modulate an intensity of light, such as shown in FIG. 5B. An advantage of using the LC SLM (500) includes that the LC SLM (500) can be easily controlled and switched on and off using an electric field. Therefore, the polarization, the intensity, and/or other properties of light can be rapidly changed or switched, such as in displays or in optical switches. The LC SLM (500) can be a fast-switchable TN SLM.

FIGS. 5A-5B show an example of a dual state LC cell operated in the first state according to an aspect of the disclosure. The first electrical signal (e.g., a "field OFF" signal) is applied to the LC cell in the dual state LC cell, for example, a field between the electrodes (501)-(502) of the LC cell may be 'OFF' (e.g., 0V or no field is applied).

FIG. 5A shows the propagation of a light beam (511) that is from the projector (122) in the dual state LC cell in the first state. The light beam (511) (e.g., the light beam (172) shown in FIG. 2A) from the projector (122) is incident onto the LC cell. In an example, the light beam (511) passes through the linear polarizer (503) and becomes a linearly polarized light beam (512) that is polarized, for example, along the X axis. In an example, the linear polarizer (503) is configured to transmit a light beam linearly polarized along a first axis (e.g., the X axis), and block a light beam linearly polarized along a second axis (e.g., the Y axis) that is perpendicular to the first axis.

When the field is "OFF" (e.g., no field is applied), the TN LC materials can rotate 90° along the light path. The LC switch (504) rotates the polarization of the light beam (512) 90° (e.g., from X axis to the Y axis), and thus a light beam (513) linearly polarized along the Y axis is generated.

Referring to FIG. 5A, the light beam (513) can subsequently go through the QWP (505) to become a circularly polarized light, such as an RCP light beam (514). The RCP light beam (514) may be reflected by the LC layer (506) as the LC layer (506) is configured to reflect light beams having the RCP. A reflected RCP light beam (515) passes through the QWP (505) to become a linearly polarized light beam (516), for example, polarized along the Y axis. The light beam (516) passes through the LC materials that rotates the polarization of the light beam (516) 90° (e.g., from Y axis to the X axis), and thus a light beam (517) is linearly polarized along the X axis. The light beam (517) passes through the polarizer (503) as a light beam (518).

Accordingly, the light beam (511) passes through the LC cell with the field "OFF" for the first time and becomes the RCP light beam (514). The RCP light beam (514) is reflected by the LC layer (506) and then passes through the LC cell with the field "OFF" for the first time and becomes the linearly polarized light beam (518). Referring to FIG. 2A, the light beam (518) may be modified by the viewing optical system (130) and sent to the light receiver at the area (151). An example of the light beam (518) is the light beam (172") in FIG. 2A.

In an example, the LC materials in the LC SLM (500) include rodlike molecules exhibiting positive birefringence, $n_e$ is from 1.56 to 1.89, $n_o$ is from 1.47 to 1.55, $\Delta n$ is from 0.05 to 0.45, and fields are from 0 to 6 V. In an example, a thickness of the QWP (505) is 0.05 mm, a total thickness of the substrates is 0.5 mm, a thickness d3 of the TN LC layer can be from 5 to 15 microns, and thus a total thickness of the LC SLM (500) can be less than 1 mm (e.g., approximately 0.5 mm).

In some examples, the display device (120) in the display system (100) (e.g., a VR NED system) is a fast LCD (also referred to as a fast LCD panel), where the light may be predominantly linearly polarized and then may be modified with a QWP to become circularly polarized, and thus the light from the display device (120) may be circularly polarized. In some examples, the display device (120) in the display system (100) (e.g., a VR NED system) is a micro OLED (µOLED) (also referred to as an µOLED panel). OLEDs in the µOLED panel may emit unpolarized light. The unpolarized light may become circularly polarized light after passing through a circular polarizer in the µOLED panel or outside the µOLED panel. Accordingly, light from the display device (120) can be prepared such that light has suitable polarization (e.g., circular polarization, such as LCP) when incident onto the LC layer (e.g., the PSCLC diffuser) (506).

FIG. 5B shows the propagation of a light beam (521) that is from the display device (120) in the dual state LC cell in the first state. The light beam (521) with the LCP from the display device (120) passes through the LC layer (506) as the LC layer (506) is configured to transmit light beams having the LCP. The transmitted light beam (522) is incident onto the LC cell. The LCP light beam (522) becomes a linear polarized (e.g., along the X axis) light beam (523) after passing through the QWP (505). When the field is "OFF", the LC switch (504) rotate the polarization of the light beam (523) 90° (e.g., from X axis to the Y axis), and thus a light beam (524) is linearly polarized along the Y axis. The light beam (524) may be blocked or may be substantially blocked by the polarizer (503). Accordingly, the light beam (521) may be blocked or may be substantially blocked by the dual state LC cell when the field is "OFF" and does not enter the eye (60). Referring to FIG. 2A, an example of the light beam (521) is the light beam (211).

Figure 5D:
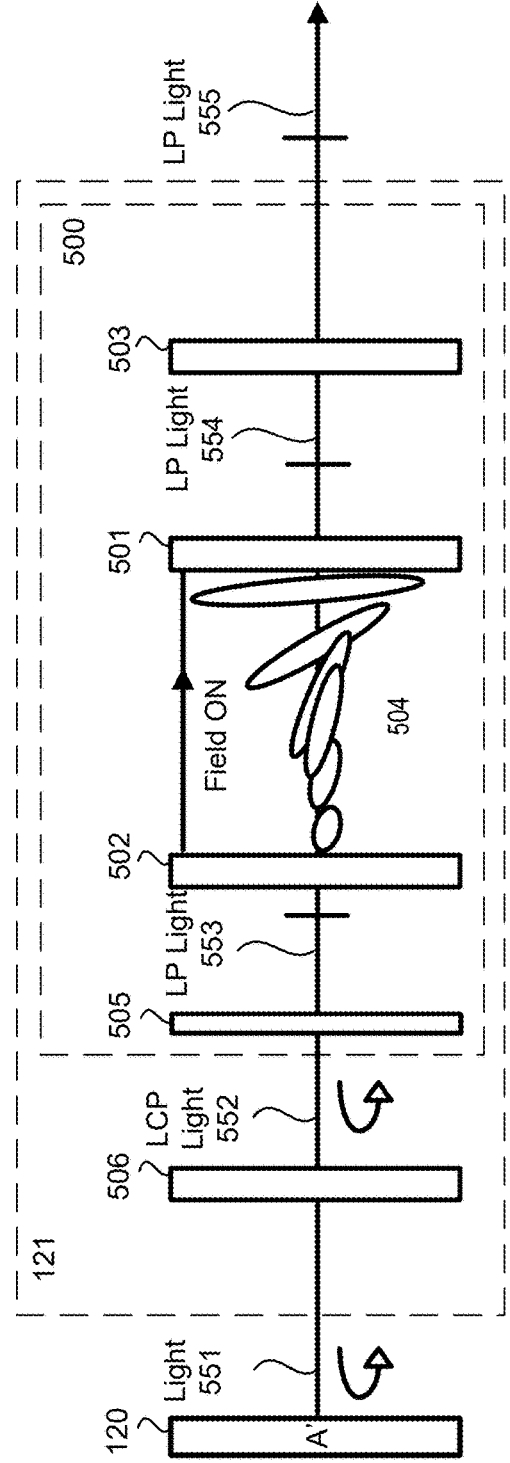

FIGS. 5C-5D show an example of an LC cell operated in the second state according to an aspect of the disclosure. The second electrical signal (e.g., a "field ON" signal) is applied to the LC cell, for example, the field between the electrodes (501)-(502) of the LC cell may be 'ON' (e.g., 5V or 6V).

FIG. 5C shows the propagation of a light beam (541) that is from the projector (122) in the dual state LC cell in the second state. The light beam (541) from the projector (122) is incident onto the LC cell. In an example, the light beam (541) passes through the polarizer (503) and becomes a linearly polarized light beam (542) along the X axis. When the field is "ON", the LC materials are oriented by an electrical field, for example, along the Z axis, and the LC switch (504) do not change the polarization of the light beam (542). Thus, a light beam (543) is linearly polarized along the X axis. The light beam (543) can subsequently go through the QWP (505) to become a circularly polarized light, such as an LCP light beam (544). The LCP light beam (544) may pass through the LC layer (506). A transmitted light beam (545) propagates toward the display device (120) and may not enter the eye (60). For example, the light beam (545) may be cancelled out by optical components in the display device (120). Accordingly, with the field "ON" in the second state, the light beam (541) passes through the dual state LC cell without entering the eye (60). An example of the light beam (541) is a light beam (241) shown in FIG. 2A.

FIG. 5D shows the propagation of a light beam (551) that is from the display device (120) in the dual state LC cell in the second state. The light beam (551) with the LCP from the display device (120) passes through the LC layer (506). The transmitted LCP light beam (552) is incident onto the LC cell. The LCP light beam (552) becomes a linear polarized (e.g., along the X axis) light beam (553) after passing through the QWP (505). When the field is "ON", the LC switch (504) do not change the polarization of the light beam (553). Thus, a light beam (554) is linearly polarized along the X axis. The light beam (554) may pass the polarizer (503) and the transmitted light beam (555) is linearly polarized along the X axis. Accordingly, the light beam (551) may transmit the dual state LC cell when the field is "ON". An example of the light beam (541) is the light beam (171) shown in FIG. 2A. An example of the light beam (555) is the light beam (171") shown in FIG. 2A. Referring to FIG. 2A, the light beam (555) may be modified by the viewing optical system (130) and sent to the light receiver at the area (151).

Reflectivity of the first region (191) in the reflective state may be defined as a ratio of reflected optical power to the incident optical power for the first region (191) in the reflective state. Referring to FIGS. 2A and 5A, the reflectivity of the first region (191) (e.g., operating in the first state or the reflective state) of the dual state LC panel (121) to light beams (including the light beam (511) from the projector (122)) may be relatively high, such as approaching 100%. In an example, the reflectivity of the first region (191) in the reflective state is larger than or equal to 90% such as 95%. The reflectivity of the first region (191) in the reflective state may be less than 100%, for example, due to scattering.

Transmittance or transmissivity of the first region (191) in the reflective state may be defined as a ratio of transmitted optical power to the incident optical power for the first region (191) in the reflective state. Referring to FIGS. 2A and 5B, the transmissivity of the first region (191) in the reflective state for light beams (including the light beam (521) from the display device (120)) may be relatively low, such as approaching 0%. In an example, the transmissivity of the first region (191) in the reflective state is less than or equal to 5% such as 0%. In an example, light from the background display (e.g., (120)) such as the first portion (193) is completely blocked, resulting in 0% transmission.

Referring to FIG. 5C, as discussed previously, in the second region (192) operating in the second state or the transparent state, light from the projector (122) may be cancelled out.

Transmittance or transmissivity of the second region (192) in the transparent state may be defined as a ratio of transmitted optical power to the incident optical power for the second region (192) in the transparent state. Referring to FIG. 5D, the transmissivity of the second region (192) in the transparent state for light beams (including the light beam (551) from the display device (120)) may be relatively high, such as approaching 100%. In an example, the transmissivity of the second region (192) in the transparent state is larger than or equal to 90% such as 95%. The transmissivity of the second region (192) in the transparent state may be less than 100%, for example, due to scattering.

As described above in FIG. 2A, the first region (191) on the dual state LC panel (121) may include the first subset of the dual state LC cells, and the second region (192) on the dual state LC panel (121) may include the second subset of the dual state LC cells. An example of the first subset of the dual state LC cells is the dual state LC cell described in FIGS. 5A-5B. An example of the second subset of the dual state LC cells is the dual state LC cell described in FIGS. 5C-5D. Thus, the first region (191) may be generated by controlling electrodes of the dual state LC cells (or the multiple LC cells), for example, by applying the first electrical signal to electrodes of the first subset of the dual state LC cells and applying the second electrical signal to electrodes of the second subset of the dual state LC cells, and thus the first region (191) (and the second region (192)) may have any suitable shape.

The LC SLM (500) and the TN LC switch (504) can be easily fabricated from a transparent TN LCD, with the targeted circular area (e.g., the first region (191)) having the field turned OFF to allow only the reflection of the light beams projected from the DLP projector (122), while the remaining area (e.g., the second region (192)) has the field ON, permitting the transmission of a low resolution (e.g., 2K) display from the background display such as the display device (120). The field ON/OFF operation on the TNLC may work simultaneously with the direction of the projection from the DLP projector (122), which may be determined by space coordination obtained from the gaze tracking.

To form the combined image (e.g., the image (301)), the location and the shape of the first image (189) are to match the location and the shape of the first region (191) such that the first image (189) may overlap with the first region (191). In an example, the first image (189) and the first region (191) are synchronized based on the gaze direction, for example, by synchronizing the operations of the projector (122) and the dual state LC panel (121). In an example, the first image (189) may completely overlap with the first region (191). In an example, the first image (189) may substantially overlap with the first region (191).

In an example, the reflective state (e.g., the first state) occurs within a movable area (e.g., a movable circular area) such as the first region (191) to accommodate the foveal vision with the super-resolution, where the super-resolution image is a reflected image from an image generated by the projector. Meanwhile, the peripheral region (e.g., the second region (192)) outside of the foveal zone remains transparent to an image having the standard resolution, making a seamless visual transition across the field of view of the entire image (e.g., the single image (301)).

In an example, the dual state LC panel (121) may be configured to switch states (e.g., the first state and the second state) fast enough to match rapid movement of a human eye. In an example, a refresh rate or a switching speed of the dual state LC panel (121) is at least 120 Hz or the like.

In an example, the dual state LC panel (121) is to have a high contrast ratio to such that the reflective mode (e.g., the first state) may provide a clear and bright image, and the transparent mode (e.g., the first state) does not noticeably degrade a quality of the image coming from the display device (120).

In an example, the high-resolution image (e.g., the first image (189)) projected onto the dual state LC panel (121) from the projector (122) may be directed or steered precisely, which may be achieved through actuators (e.g., mechanical actuators) or other steering methods, for example, in milliseconds, that may be adjusted based on the eye tracking data.

A boundary alignment may be performed such that the transition between the high-resolution area (e.g., having the second PPD) and the low-resolution area (e.g., having the first PPD) in the combined image (e.g., the image (301)) may be seamless to the user. The boundary alignment may be achieved using suitable image rendering techniques to avoid a noticeable boundary.

In an example, the eye tracking is to be precise and fast, as the display system may depend on accurate gaze direction information (e.g., gaze vector information) to switch the LC panel states and steer the projection from the projector correctly.

In various examples, the switching speed of the dual state LC cells in the dual state LC panel, the precise projection steering of the projector, the seamless image blending (or the boundary alignment), and accurate eye tracking may be important for the display system. Further, weight, power consumption, and heat dissipation may be important in a wearable VR system. With advancements in liquid crystal technology, eye tracking, and micro-projection systems represent a significant leap forward in VR display technologies including the display systems and the methods described in the disclosure.

The display system (100) can be a component in a suitable artificial reality system. The artificial reality system can adjust reality in some manner into artificial reality and then present the artificial reality to a user. The artificial reality can include, e.g., a VR, an augmented reality (AR), a mixed reality (MR), a hybrid reality, or some combination and/or derivatives thereof. Artificial reality content may include completely generated content or generated content combined with captured (e.g., real objects in a real world) content. The artificial reality content may include video, audio, haptic feedback, or some combination thereof, and any of which can be presented in a single channel or in multiple channels (such as stereo video that produces a three-dimensional effect to the user). In some examples, the display system (100) can be applied to playback of live or prerecorded video.

In an aspect, a "near eye" display system can include an optical system (e.g., including one or more optical elements) that is configured to be placed within the distance threshold of an eye of a user when the display system (100) (e.g., an HMD system, or smart glasses) is utilized. The display system (100) can be a NED system implemented in various forms, such as an HMD system, smart glasses, a smart phone, and/or the like. In some examples, the artificial reality system is implemented as a standalone NED system. In some examples, the artificial reality system is implemented as a NED system connected to a host computer system, such as a server device, a console device, and the like.

The display system (100) can include other suitable mechanical, electrical and optical components. For example, the display system (100) includes a frame or housing, that can protect other components of the display system (100). In another example, the display system (100) can include communication components (e.g., communication software and hardware) to wirelessly communicate with a network, a host device, and/or other device. In some examples, the display system (100) can include a light combiner that can combine the virtual content and see-through real environment.

Figure 6A:
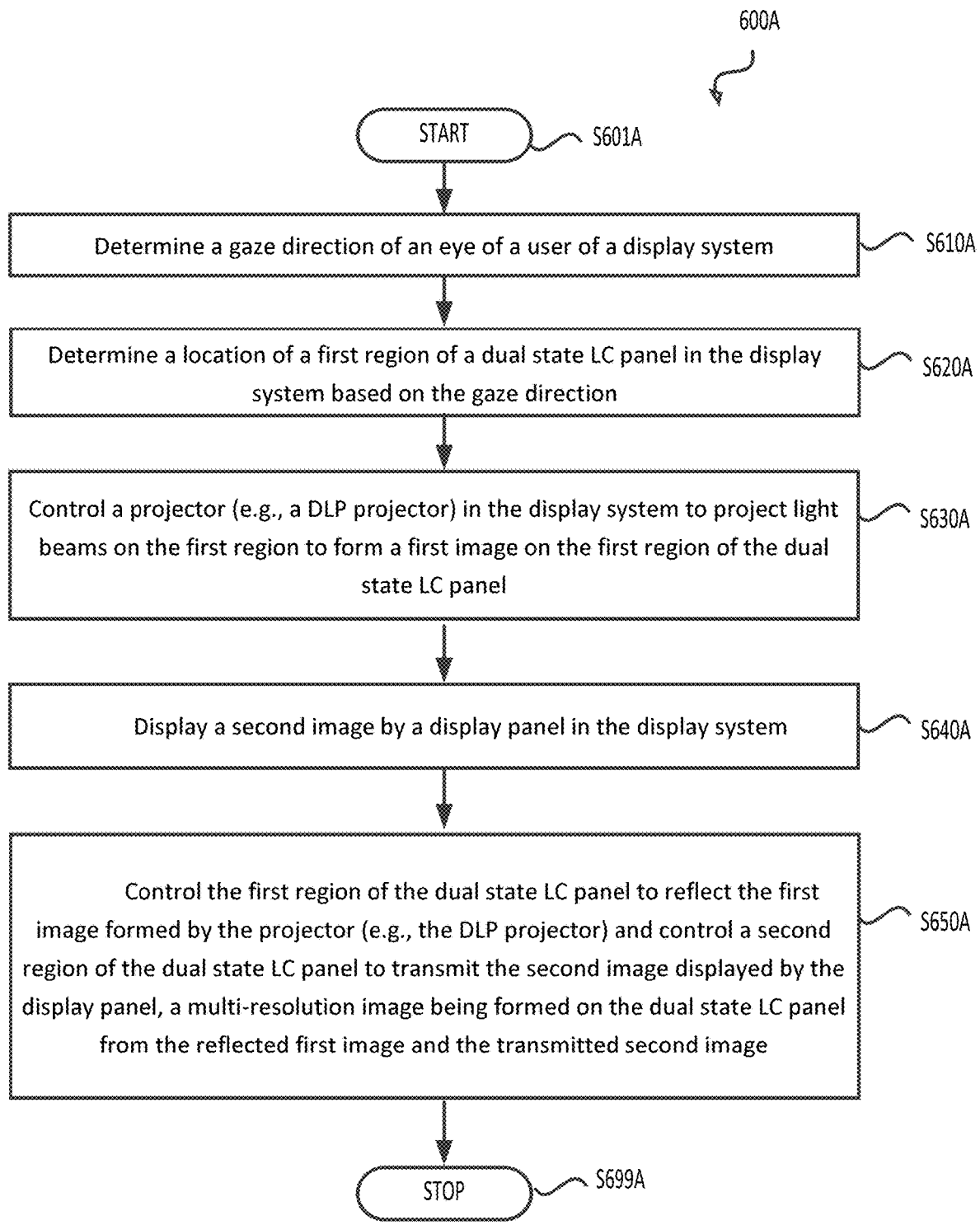
FIG. 6A shows a flow chart outlining a process according to some aspect of the disclosure.

FIG. 6A shows a flow chart outlining a process (600A) according to some aspect of the disclosure. In an example, a display system or an HMD system, such as the display system (100) may perform the process (600A). In an example, certain steps in the process (600A) are executed by processing circuitry, such as processing circuitry in the controller (180). The process (600A) starts at step (S601A) and proceeds to step (S610A).

At step (S610A), a gaze direction of an eye of a user of a display system is determined. The display system (e.g., the display system (100)) includes a projector (e.g., the projector (122)), a display panel (also interchangeably referred to as a display device) (e.g., the display device (120)), and a dual state LC panel (e.g., the dual state LC panel (121)), such as described in FIG. 2A. In an example, the display system is a VR head mounted display (HMD) system.

At step (S620A), a location of a first region (e.g., the first region (191)) of the dual state LC panel is determined based on the gaze direction, such as described in FIG. 2A.

At step (S630A), the projector is controlled to project light beams on the first region to form a first image (e.g., the first image (189)) on the first region of the dual state LC panel, such as described in FIG. 2A.

In an example, directions of the projected light beams that are incident onto the first region on the dual state LC panel are controlled such that angles between directions of the reflected light beams of the first image and the gaze direction are less than a threshold angle (e.g., the threshold angle $\alpha_0$) and the first image is positioned substantially within a central vision of the eye of the user of the display system, such as described in FIGS. 1A-1C and 2.

In an example, the projector is a DLP projector.

At step (S640A), a second image (e.g., the second image (195)) is displayed by the display device. In an example, the first image formed by the projector has a resolution that is higher than a resolution of the second image formed by the display panel (or the display device).

At step (S650A), the dual state LC panel is controlled to operate in a dual state by (i) controlling the first region of the dual state LC panel to reflect the first image formed by the projector and (ii) controlling a second region of the dual state LC panel to transmit the second image displayed by the display device, such as described with reference to FIGS. 2, 5A, 5B, and 5D.

In an example, the first region of the dual state LC panel is controlled to substantially block a first portion of the second image displayed by the display device. The second region of the dual state LC panel is controlled to transmit a second portion of the second image. The second portion of the second image is outside the first portion of the second image.

In an example, the first image and the first portion of the second image include a same image having different resolutions.

In an aspect, the combined image (e.g., the image (301)) is formed on the dual state LC panel from the reflected first image (e.g., having a higher resolution than that of the second image) and the transmitted second image, such as described with reference to FIGS. 2A and 3A-3C. The combined image is a multi-resolution image including portions with different resolutions.

In an example, the dual state LC panel includes an LC spatial light modulator (SLM) (e.g., the LC SLM (500)) and an LC layer (e.g., the LC layer (506)) attached to the LC SLM, such as described in FIGS. 5A-5D. The LC layer is configured to reflect light beams having a first circular polarization and to transmit light beams having a second circular polarization, handedness of the first circular polarization being opposite to handedness of the second circular polarization. The LC SLM includes multiple LC cells that are individually controlled. In an example, a first electrical signal is applied to a first subset of the multiple LC cells to form the first region that includes the first subset of the multiple LC cells and a first portion of the LC layer. The first subset of the multiple LC cells and the first portion of the LC layer form a first subset of dual state LC cells. In an example, a second electrical signal is applied to a second subset of the multiple LC cells to form the second region including the second subset of the multiple LC cells and a second portion of the LC layer. The second subset of the multiple LC cells and the second portion of the LC layer form a second subset of the dual state LC cells.

In an example, the controller is configured to synchronize operations of the dual state LC panel and the projector. The dual state LC panel and the projector may be controlled based on the gaze direction.

In an example, the LC layer includes a polymer-stabilized cholesteric LC (PSCLC) diffuser.

Then, the process (600A) proceeds to step (S699A) and terminates.

The process (600A) can be suitably adapted to various scenarios and steps in the process (600A) can be adjusted accordingly. One or more of the steps in the process (600A) can be adapted, omitted, repeated, and/or combined. Any suitable order can be used to implement the process (600A). Additional step(s) can be added.

In an example, the first region (e.g., the first region (191)) is controlled to block a portion of the second image (e.g., the second image (195)). The first image (e.g., the first image (189)) formed by the projector includes an image of a higher resolution and the portion of the second image formed by the display device includes the image of a lower resolution, such as described with reference to FIGS. 3A-3C.

In an example, an average angle of angles between directions of the transmitted light beams of the second image (e.g., the transmitted light beams of the second portion of the second image) and the gaze direction is larger than the threshold angle and the transmitted second portion of the second image is substantially positioned within a peripheral vision of the eye, and the peripheral vision is outside the central vision of the eye.

Figure 6B:
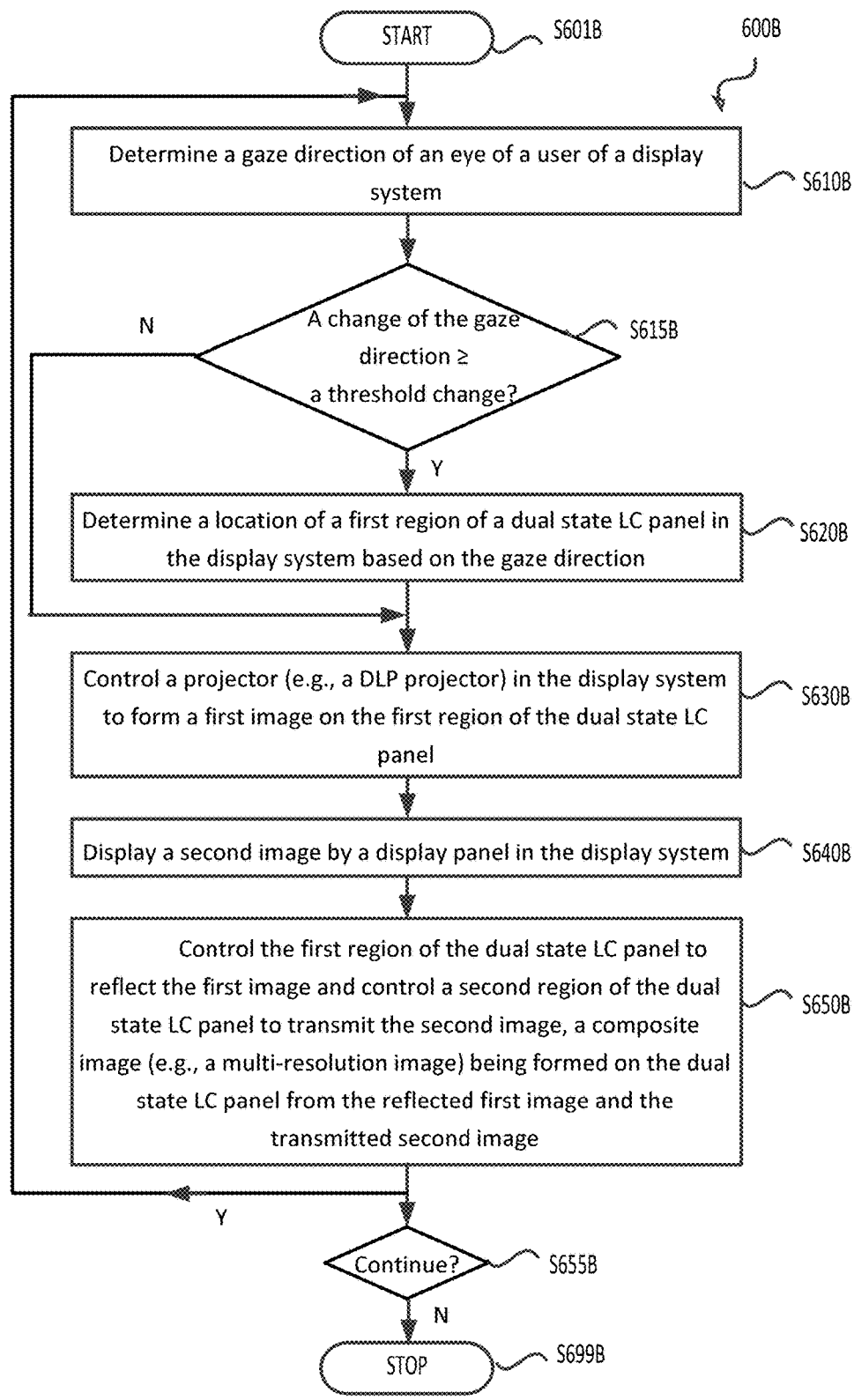
FIG. 6B shows a flow chart outlining a process according to some aspect of the disclosure.

FIG. 6B shows a flow chart outlining a process (600B) according to some aspect of the disclosure. In an example, a display system or an HMD system, such as the display system (100) may perform the process (600B). In an example, certain steps in the process (600B) are executed by processing circuitry, such as processing circuitry in the controller (180). The process (600B) starts at step (S601B) and proceeds to step (S610B).

At step (S610B), a gaze direction of an eye of a user of a display system is determined, such as described in the step (S610A). The display system (e.g., the display system (100)) includes a projector (e.g., the projector (122)), a display panel (e.g., the display device (120)), and a dual state LC panel (e.g., the dual state LC panel (121)), such as described in FIG. 2A. In an example, the display system is a VR head mounted display (HMD) system.

At step (S615B), whether a change (such as a percentage change or an absolute change) of the gaze direction satisfies a condition is determined. In an example, the condition is the change of the gaze direction is larger than or equal to a threshold change. If the change of the gaze direction is determined to be larger than or equal to the threshold change, the process (600B) proceeds to step (S620B); otherwise, if the change of the gaze direction is determined to be less than the threshold change, the process (600B) proceeds to step (S630B) (e.g., skipping the step (S620B)).

At step (S620B), a location of a first region (e.g., the first region (191)) of the dual state LC panel is determined based on the gaze direction, such as described in FIG. 2A or step (S620A).

At step (S630B), the projector is controlled to form a first image (e.g., the first image (189)) on the first region of the dual state LC panel, such as described in FIG. 2A or step (S630A).

At step (S640B), a second image (e.g., the second image (195)) is displayed by the display device, such as described at step (S640A). In an example, the first image formed by the projector has a resolution that is higher than a resolution of the second image formed by the display panel (or the display device).

At step (S650B), the dual state LC panel is controlled to operate in a dual state by (i) controlling the first region of the dual state LC panel to reflect the first image formed by the projector and (ii) controlling a second region of the dual state LC panel to transmit the second image displayed by the display device, such as described with reference to FIGS. 2, 5A, 5B, 5D, and in step (S650A). In an example, a composite image (e.g., a multi-resolution image) may be formed on the dual state LC panel from the reflected first image and the transmitted second image.

At step (S655B), whether the process (600B) continues is determined. If the process (600B) is determined to continue, the process (600B) goes back to (S610B), and thus continues to check the gaze direction of the eye of the user of the display system. Otherwise, the process (600B) proceeds to step (S699B) and terminates.

The process (600B) can be suitably adapted to various scenarios and steps in the process (600B) can be adjusted accordingly. One or more of the steps in the process (600B) can be adapted, omitted, repeated, and/or combined. Any suitable order can be used to implement the process (600B). Additional step(s) can be added.

As described, the process (600B) may include a loop having multiple repetitions. Whether the components in the display system operate under the same conditions (e.g., the location of the first region remains the same for the dual state LC panel) may depend on how the gaze direction changes. When the change of the gaze direction is relatively small (e.g., less than the threshold change), steps (S630B), (S640B), and (S650B) may be performed such that the components in the display system may operate under the same conditions as the previous repetition, which is similar to a static display where the gaze direction is not considered.

Computer vision techniques and/or machine learning can detect the pupil and calculate the gaze direction. In an example, the space coordinate of the gaze direction can be captured by the eye-tracking system and transmitted to the chips. Simultaneously, the controller can identify which segments of the ITO electrodes are to be activated or deactivated to align the position of the first region in the dual state LC panel with the gaze direction.

Aspects in the disclosure may be used separately or combined in any order.

In an example, a first portion of an image is generated using a display device (e.g., the projector (122)) where the first portion has a high pixel density (e.g., the second PPD). A second portion of the image may be generated, for example, using another display device (e.g., the display device (120)) where the second portion has a low pixel density (e.g., the first PPD). The first portion with the high pixel density may be reflected off the first region of the dual state LC panel, and the second portion with the low pixel density may transmit through the second region of the dual state LC panel, such as described in FIG. 2A. Thus, the first portion of the image and the second portion of the image may be combined into a single image (e.g., the image (301)). A location of the first portion within the combined image can vary based on the gaze direction.

In an example, a super resolution display may be generated for VR display applications using the methods and the display systems described in the disclosure. A TN LC SLM may be constructed on a glass substrate with a passive matrix addressing method or an active matrix addressing method, and the electrodes (e.g., ITO) may be referred to as a matrix ITO. The design may allow for an active area (e.g., a circular area) of about 15 mm in diameter and the active area (e.g., the first region (191)) may move freely across the entire substrate (or the entire dual state LC panel (121)). The precise location may be continuously adjusted based on the gaze direction of the user that is captured by the eye-tracking system. Control over the the activation and deactivation of the TN LC SLM may be exerted through the matrix addressing method. This arrangement may facilitate the projection of high-resolution imagery by the projector directly into the foveal region of the user, significantly enhancing the VR experience with the superior resolution and the high PPD.

The display device (120) may include an LCD fast display panel, a μOLED fast display panel, or the like that is configured to display images, for example, to be used in the peripheral vision.

In an example, the display system (100) is a VR display system. In an example, the display system (100) is a VR NED. In an example, the viewing optical system (130) may be a pancake lens system. For example, a light path in the viewing optical system (130) (e.g., a pancake lens system) may be folded and thus the viewing optical system (130) has a small thickness.

In some examples, foveated rendering is performed to improve visual effect, however, foveated rendering may use a large amount of computational resources such as GPU power. According to an aspect of the disclosure, using a low pixel density in the peripheral vision and using a high pixel density in the central vision may reduce the amount of computations such as the computations used in foveated rendering, and thus the methods and the display system described in the disclosure may use less computation power and thus has less latency. Further, the image quality is relatively high since the central vision where the eye has high visual acuity has the high pixel density.

While related technologies employ optical combiners and additional display modules that may combine images, the methods (e.g., including the process (600A)) and the display systems (e.g., (100)) in the disclosure use liquid crystal technologies and may be a simpler implementation and/or a more cost-effective implementation.

The display system may feature a super resolution image (e.g., the first image (189) or the reflected image (389)) within a circular area (e.g., the first region (191)) that may be achieved through reflection of the projected light beams from the projector (122), while the peripheral vision is provided by a background display (e.g., the second portion (194) of the second image (195) or the transmitted image (394)).

The display system (e.g., (100)) may deliver dual resolutions (e.g., the first PPD and the second PPD) within the same field of view (e.g., the same image (301)), and use eye-tracking technology such that the higher resolution portion of the image (e.g., the first image (189)) is aligned with the central vision of the user.

In an example, a static display system includes the display devices (120) and (122), the dual state LC panel (121), and the viewing optical system (130) may be used to combine images with different resolutions, for example, when the gaze direction of the eye does not change significantly. The image having the higher resolution may be positioned within the central vision of the eye.

A computer or computer-readable medium can control various aspects of an HMD system in which the display system (100) is incorporated, including, for example, controlling the eye tracking system (370) to determine the gaze direction, controlling the projector (122) (e.g., by controlling the actuator or the steering device (181)) based on the gazing directions, controlling the dual state LC panel based on the gazing directions, synchronizing operations of multiple components in the display system (100) (e.g., synchronizing the operations of the dual state LC panel (121) and the projector (122)), and/or the like. The various aspects of the display system (100) can be implemented as computer software using computer-readable instructions and physically stored in one or more computer-readable media. For example, FIG. 7 shows a computer system (700) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
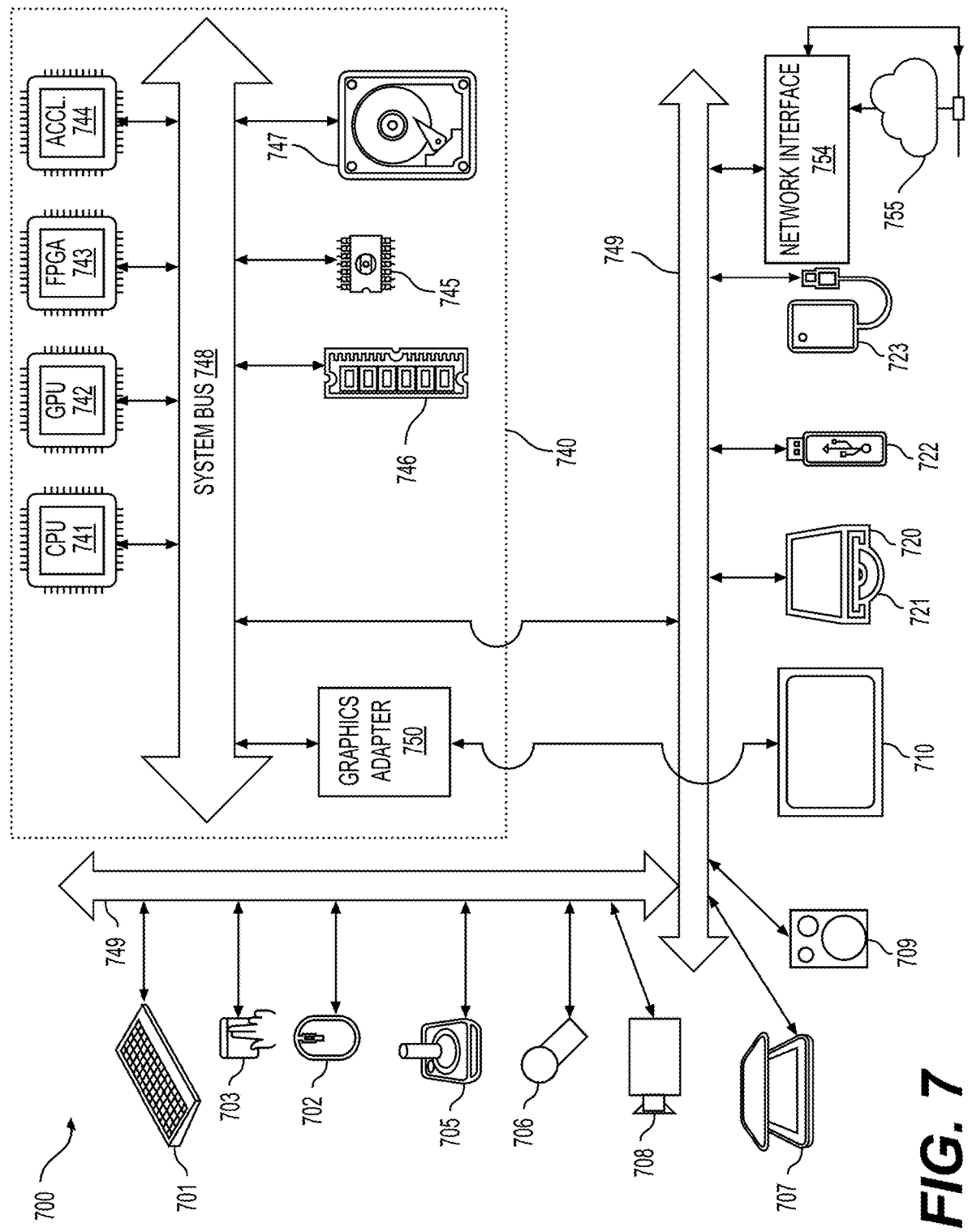
FIG. 7 is a schematic illustration of a computer system in accordance with an aspect.

The components shown in FIG. 7 for computer system (700) are exemplary in nature and are not intended to suggest any limitation as to the scope of use or functionality of the computer software implementing aspects of the present disclosure. Neither should the configuration of components be interpreted as having any dependency or requirement relating to any one or combination of components illustrated in the exemplary aspect of a computer system (700).

Computer system (700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: projected images, photographic images obtain from a still image camera), video (such as two-dimensional video, three-dimensional video including stereoscopic video).

Input human interface devices may include one or more of (only one of each depicted): keyboard (701), mouse (702), trackpad (703), touch-screen (710), data-glove (not shown), joystick (705), microphone (706), scanner (707), camera (708).

Computer system (700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (710), data-glove (not shown), or joystick (705), but there can also be tactile feedback devices that do not serve as input devices), audio output devices (such as: speakers (709), headphones (not depicted)), visual output devices (such as touch-screens (710) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (700) can also include human accessible storage devices and their associated media such as optical media including CD/DVD ROM/RW (720) with CD/DVD or the like media (721), thumb-drive (722), removable hard drive or solid state drive (723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (700) can also include an interface (754) to one or more communication networks (755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system (700)); others are commonly integrated into the core of the computer system (700) by attachment to a system bus as described below (for example Ethernet interface into a PC computer system or cellular network interface into a smartphone computer system). Using any of these networks, computer system (700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (740) of the computer system (700).

The core (740) can include one or more Central Processing Units (CPU) (741), Graphics Processing Units (GPU) (742), specialized programmable processing units in the form of Field Programmable Gate Areas (FPGA) (743), hardware accelerators (744) for certain tasks, graphics adapters (750), and so forth. These devices, along with Read-only memory (ROM) (745), Random-access memory (746), internal mass storage (747) such as internal non-user accessible hard drives, SSDs, and the like, may be connected through a system bus (748). In some computer systems, the system bus (748) can be accessible in the form of one or more physical plugs to enable extensions by additional CPUs, GPU, and the like. The peripheral devices can be attached either directly to the core's system bus (748), or through a peripheral bus (749). In an example, the touchscreen (710) can be connected to the graphics adapter (750). Architectures for a peripheral bus include PCI, USB, and the like.

CPUs (741), GPUs (742), FPGAs (743), and accelerators (744) can execute certain instructions that, in combination, can make up the aforementioned computer code. That computer code can be stored in ROM (745) or RAM (746). Transitional data can be also be stored in RAM (746), whereas permanent data can be stored for example, in the internal mass storage (747). Fast storage and retrieve to any of the memory devices can be enabled through the use of cache memory, that can be closely associated with one or more CPU (741), GPU (742), mass storage (747), ROM (745), RAM (746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system (700) having architecture, and specifically the core (740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (740) that are of non-transitory nature, such as core-internal mass storage (747) or ROM (745). The software implementing various aspects of the present disclosure can be stored in such devices and executed by core (740). A computer-readable medium can include one or more memory devices or chips, according to particular needs. The software can cause the core (740) and specifically the processors therein (including CPU, GPU, FPGA, and the like) to execute particular processes or particular parts of particular processes described herein, including defining data structures stored in RAM (746) and modifying such data structures according to the processes defined by the software. In addition or as an alternative, the computer system can provide functionality as a result of logic hardwired or otherwise embodied in a circuit (for example: accelerator (744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A display system, comprising:
   a projector configured to project light beams on a first region of a dual state liquid crystal (LC) panel to form a first image on the first region of the dual state LC panel, the dual state LC panel including an LC spatial light modulator (SLM) and an LC layer attached to the LC SLM, and the LC SLM including multiple LC cells that are individually controlled;
   a display panel configured to display a second image;
   the dual state LC panel disposed between the projector and the display panel and configured to operate in a dual state in which the first region of the dual state LC panel is configured to reflect the light beams projected by the projector and a second region of the dual state LC panel is configured to transmit light beams of the second image from the display panel;
   a viewing optical system configured to direct the reflected light beams of the first image and the transmitted light beams of the second image onto different areas of a retina of an eye of a user of the display system;
   a sensor configured to generate gaze direction information indicating a gaze direction of the eye; and
   processing circuitry configured to:
     determine the gaze direction based on the gaze direction information;
     determine a location of the first region on the dual state LC panel based on the gaze direction;
     control the dual state LC panel to operate in the dual state and the projector to project the light beams on the first region on the dual state LC panel;
     apply a first electrical signal to a first subset of the multiple LC cells, the first subset of the multiple LC cells and a first portion of the LC layer corresponding to the first region of the dual state LC panel; and
     apply a second electrical signal to a second subset of the multiple LC cells, the second subset of the multiple LC cells and a second portion of the LC layer corresponding to the second region of the dual state LC panel, wherein
   the LC layer is configured to reflect light beams having a first circular polarization and to transmit light beams having a second circular polarization, handedness of the first circular polarization being opposite to handedness of the second circular polarization; and
   the LC SLM is disposed between the LC layer and the projector.

2. The display system according to claim 1, wherein the first image formed by the projector has a resolution that is higher than a resolution of the second image formed by the display panel.

3. The display system according to claim 2, wherein
the first region of the dual state LC panel is configured to block a portion of the second image; and
the first image and the portion of the second image include a same image having different resolutions.

4. The display system according to claim 2, wherein the processing circuitry is further configured to control directions of the projected light beams that are incident onto the first region on the dual state LC panel such that angles between directions of the reflected light beams of the first image and the gaze direction are less than a threshold angle and the first image is positioned within a central vision of the eye of the user of the display system.

5. The display system according to claim 4, wherein an average angle of angles between directions of the transmitted light beams of the second image and the gaze direction is larger than the threshold angle and the transmitted light beams of the second image are positioned within a peripheral vision of the eye, and the peripheral vision is outside the central vision of the eye.

6. The display system according to claim 1, wherein the LC layer includes a polymer-stabilized cholesteric LC (PSCLC) diffuser.

7. The display system according to claim 1, wherein the projector is a digital light processing (DLP) projector.

8. The display system according to claim 1, wherein the processing circuitry is configured to control the dual state LC panel and the projector based on the gaze direction.

9. The display system according to claim 1, wherein the display system is a head mounted display (HMD) system.

10. A method of forming a multi-resolution image, comprising:
determining a gaze direction of an eye of a user of a display system, the display system including a projector, a display panel, and a dual state LC panel, the dual state LC panel including an LC spatial light modulator (SLM) and an LC layer attached to the LC SLM, the LC layer being configured to reflect light beams having a first circular polarization and to transmit light beams having a second circular polarization, handedness of the first circular polarization being opposite to handedness of the second circular polarization, the LC SLM including multiple LC cells that are individually controlled;
determining a location of a first region of the dual state LC panel based on the gaze direction;
controlling the projector to project light beams on the first region to form a first image on the first region of the dual state LC panel;
displaying a second image by the display panel;
controlling the first region of the dual state LC panel to reflect the first image formed by the projector, the controlling the first region including applying a first electrical signal to a first subset of the multiple LC cells, the first subset of the multiple LC cells and a first portion of the LC layer corresponding to the first region of the dual state LC panel; and
controlling a second region of the dual state LC panel to transmit the second image, the controlling the second region including applying a second electrical signal to a second subset of the multiple LC cells, the second subset of the multiple LC cells and a second portion of the LC layer corresponding to the second region of the dual state LC panel, wherein
the multi-resolution image including the reflected first image and the transmitted second image is formed on the dual state LC panel.

11. The method according to claim 10, wherein the first image formed by the projector has a resolution that is higher than a resolution of the second image formed by the display panel.

12. The method according to claim 11, wherein
the controlling the first region includes controlling the first region to block a portion of the second image; and
the first image and the portion of the second image include a same image having different resolutions.

13. The method according to claim 11, wherein the controlling the projector comprises:
controlling directions of the projected light beams that are incident onto the first region on the dual state LC panel such that angles between directions of the reflected light beams of the first image and the gaze direction are less than a threshold angle and the first image is positioned within a central vision of the eye of the user of the display system.

14. The method according to claim 13, wherein an average angle of angles between directions of the transmitted light beams of the second image and the gaze direction is larger than the threshold angle and the transmitted light beams of the second image are positioned within a peripheral vision of the eye, and the peripheral vision is outside the central vision of the eye.

15. The method according to claim 10, wherein the LC layer includes a polymer-stabilized cholesteric LC (PSCLC) diffuser.

16. The method according to claim 10, wherein the projector is a digital light processing (DLP) projector.

17. The method according to claim 10, further comprising controlling the dual state LC panel and the projector based on the gaze direction.

18. The method according to claim 10, wherein the display system is a head mounted display (HMD) system.

* * * * *